US007649337B2

(12) United States Patent
Uehlein-Proctor et al.

(10) Patent No.: US 7,649,337 B2
(45) Date of Patent: Jan. 19, 2010

(54) POWER TOOL INCLUDING A FUEL GAUGE AND METHOD OF OPERATING THE SAME

(75) Inventors: Nancy Uehlein-Proctor, Nashotah, WI (US); Jeffrey S. Holly, Menomonee Falls, WI (US); Matthew J. Mergener, Germantown, WI (US)

(73) Assignee: Milwaukee Electric Tool Corporation, Brookfield, WI (US)

( * ) Notice: Subject to any disclaimer, the term of this patent is extended or adjusted under 35 U.S.C. 154(b) by 333 days.

(21) Appl. No.: 11/435,596

(22) Filed: May 17, 2006

(65) Prior Publication Data

US 2006/0267556 A1 Nov. 30, 2006

Related U.S. Application Data

(60) Provisional application No. 60/682,192, filed on May 17, 2005.

(51) Int. Cl.
*H02J 7/00* (2006.01)

(52) U.S. Cl. ....................... 320/112; 324/432; 324/434; 324/435; 81/473; 320/114

(58) Field of Classification Search ................. 320/107, 320/112–116, 101; 439/155, 352, 500, 929; 81/473; 324/432, 434, 435
See application file for complete search history.

(56) References Cited

U.S. PATENT DOCUMENTS

| | | | |
|---|---|---|---|
| 2,106,937 | A | 2/1938 | Torbert, Jr. |
| 2,348,266 | A | 5/1944 | Selby |
| 2,414,637 | A | 1/1947 | Crump |
| 2,791,142 | A | 5/1957 | Lyon |
| 2,876,273 | A | 3/1959 | Hall |
| 3,028,890 | A | 4/1962 | Atkinson et al. |
| 3,101,542 | A | 8/1963 | Fodor |
| 3,734,207 | A | 5/1973 | Fishbein |
| 3,973,605 | A | 8/1976 | DeCaro |
| 4,050,003 | A | 9/1977 | Owings et al. |
| 4,170,909 | A | 10/1979 | Wagner |

(Continued)

FOREIGN PATENT DOCUMENTS

| | | |
|---|---|---|
| CN | 2258109 Y | 7/1997 |

(Continued)

OTHER PUBLICATIONS

GB0609768.7 Patent Application Search Report, dated Jun. 27, 2008, 5 pages.

(Continued)

*Primary Examiner*—Edward Tso
*Assistant Examiner*—Arun Williams
(74) *Attorney, Agent, or Firm*—Michael Best & Friedrich LLP

(57) ABSTRACT

A power tool and a method of operating a power tool. The power tool can include a housing supporting a motor, a switch assembly, and a fuel gauge. The method can include the acts of activating the switch assembly to electrically connect the motor and a battery, measuring a state of charge of the battery, displaying the state of charge on the fuel gauge before electrically connecting the motor and the battery, and stopping the display of the state of charge before deactivating the switch assembly.

21 Claims, 16 Drawing Sheets

U.S. PATENT DOCUMENTS

| | | | | |
|---|---|---|---|---|
| 4,265,984 | A | 5/1981 | Kaye | |
| 4,332,147 | A | 6/1982 | Grech | |
| 4,347,450 | A | 8/1982 | Colligan | |
| 4,410,846 | A | 10/1983 | Gerber et al. | |
| 4,522,270 | A | 6/1985 | Kishi | |
| 4,567,476 | A | 1/1986 | Lang | |
| 4,626,765 | A | 12/1986 | Tanaka | |
| 4,638,237 | A | 1/1987 | Fernandez | |
| 4,659,976 | A | 4/1987 | Johanson | |
| 4,743,831 | A | 5/1988 | Young | |
| 4,759,240 | A | 7/1988 | Lin | |
| 4,876,632 | A | 10/1989 | Osterhout et al. | |
| D304,419 | S | 11/1989 | Henck et al. | |
| 4,912,349 | A | 3/1990 | Chang | |
| 4,962,347 | A | 10/1990 | Burroughs et al. | |
| 4,962,681 | A | 10/1990 | Yang | |
| 4,976,173 | A | 12/1990 | Yang | |
| 5,016,501 | A | 5/1991 | Holzer, Jr. | |
| 5,032,825 | A | 7/1991 | Kuznicki | |
| 5,065,476 | A | 11/1991 | Dohse et al. | |
| 5,105,130 | A | 4/1992 | Barker et al. | |
| 5,121,803 | A | 6/1992 | Hartmann et al. | |
| 5,122,427 | A | 6/1992 | Flowers et al. | |
| 5,130,658 | A * | 7/1992 | Bohmer | 324/435 |
| 5,149,230 | A | 9/1992 | Nett | |
| 5,213,913 | A | 5/1993 | Anthony, III et al. | |
| 5,229,701 | A | 7/1993 | Leman et al. | |
| 5,248,929 | A | 9/1993 | Burke | |
| 5,251,706 | A | 10/1993 | Evans | |
| 5,293,156 | A | 3/1994 | Shoji et al. | |
| 5,372,420 | A | 12/1994 | Van Deursen et al. | |
| 5,407,381 | A | 4/1995 | Schaefer et al. | |
| 5,489,484 | A | 2/1996 | Wheeler et al. | |
| 5,519,383 | A | 5/1996 | De La Rosa | |
| RE35,258 | E | 6/1996 | Palm | |
| 5,525,889 | A | 6/1996 | Chan et al. | |
| 5,533,581 | A | 7/1996 | Barth et al. | |
| 5,589,288 | A | 12/1996 | Coulson et al. | |
| D377,303 | S | 1/1997 | Nagel | |
| 5,620,808 | A | 4/1997 | Wheeler | |
| 5,661,942 | A | 9/1997 | Palmer | |
| 5,663,011 | A | 9/1997 | Bunyea et al. | |
| 5,681,667 | A | 10/1997 | Bunyea et al. | |
| D388,060 | S | 12/1997 | Tanaka et al. | |
| 5,697,158 | A | 12/1997 | Klinzing et al. | |
| 5,718,985 | A | 2/1998 | Bunyea et al. | |
| 5,737,982 | A | 4/1998 | Lin | |
| 5,751,217 | A | 5/1998 | Kchao et al. | |
| 5,778,649 | A | 7/1998 | Losdahl et al. | |
| 5,784,934 | A | 7/1998 | Izumisawa | |
| 5,789,101 | A | 8/1998 | Wheeler et al. | |
| 5,798,702 | A * | 8/1998 | Okamoto et al. | 340/636.1 |
| 5,800,940 | A | 9/1998 | Bunyea et al. | |
| 5,844,401 | A | 12/1998 | Lee | |
| 5,856,038 | A | 1/1999 | Mason | |
| 5,919,585 | A | 7/1999 | Wheeler et al. | |
| 5,966,079 | A | 10/1999 | Tanguay | |
| D418,729 | S | 1/2000 | Snider | |
| 6,039,126 | A | 3/2000 | Hsieh | |
| 6,050,989 | A | 4/2000 | Fox et al. | |
| 6,057,608 | A | 5/2000 | Bailey, Jr. et al. | |
| 6,075,341 | A | 6/2000 | White et al. | |
| 6,102,134 | A | 8/2000 | Alsruhe | |
| 6,102,632 | A | 8/2000 | Potter et al. | |
| 6,108,867 | A | 8/2000 | Nagashima | |
| 6,139,359 | A | 10/2000 | Fuhreck et al. | |
| 6,140,927 | A | 10/2000 | Whitmire | |
| 6,144,122 | A | 11/2000 | Covell et al. | |
| 6,168,881 | B1 | 1/2001 | Fischer et al. | |
| 6,175,303 | B1 * | 1/2001 | Theofanopoulos et al. | 340/455 |
| 6,191,557 | B1 | 2/2001 | Gray et al. | |
| 6,201,372 | B1 | 3/2001 | Green, Jr. et al. | |
| D441,267 | S | 5/2001 | Heun | |
| D442,455 | S | 5/2001 | Shiao | |
| 6,237,698 | B1 | 5/2001 | Carrier et al. | |
| RE37,226 | E | 6/2001 | Wheeler et al. | |
| D443,491 | S | 6/2001 | Robson | |
| 6,252,380 | B1 | 6/2001 | Koenck | |
| D447,924 | S | 9/2001 | Neitzell et al. | |
| 6,296,427 | B1 | 10/2001 | Potter et al. | |
| 6,297,618 | B2 * | 10/2001 | Emori et al. | 320/132 |
| 6,304,058 | B2 | 10/2001 | Watson et al. | |
| 6,311,583 | B1 | 11/2001 | Izumisawa | |
| 6,321,856 | B1 | 11/2001 | Alsruhe | |
| 6,329,788 | B1 | 12/2001 | Bailey, Jr. et al. | |
| D456,353 | S | 4/2002 | Shown et al. | |
| 6,364,033 | B1 | 4/2002 | Hung et al. | |
| D457,131 | S | 5/2002 | Kitoh et al. | |
| 6,386,730 | B1 | 5/2002 | Matthews | |
| 6,396,407 | B1 | 5/2002 | Kobayashi | |
| 6,436,569 | B1 | 8/2002 | Dijkstra et al. | |
| 6,439,088 | B1 | 8/2002 | Eytchison et al. | |
| 6,461,088 | B2 | 10/2002 | Potter et al. | |
| 6,467,556 | B2 | 10/2002 | Alsruhe | |
| 6,501,197 | B1 | 12/2002 | Cornog et al. | |
| 6,515,451 | B2 | 2/2003 | Watson et al. | |
| D472,439 | S | 4/2003 | Chunn et al. | |
| D472,779 | S | 4/2003 | Chunn et al. | |
| D475,907 | S | 6/2003 | Neitzell et al. | |
| D476,542 | S | 7/2003 | Chunn et al. | |
| 6,602,634 | B1 | 8/2003 | Wheeler et al. | |
| D479,352 | S | 9/2003 | Ng | |
| D479,455 | S | 9/2003 | Waldron | |
| 6,650,089 | B1 | 11/2003 | Freeman et al. | |
| 6,653,815 | B2 | 11/2003 | Watson et al. | |
| 6,653,816 | B2 | 11/2003 | Peek et al. | |
| D484,382 | S | 12/2003 | Su | |
| 6,656,626 | B1 | 12/2003 | Mooty et al. | |
| 6,672,402 | B2 | 1/2004 | Ortt et al. | |
| 6,673,485 | B2 | 1/2004 | Kimura et al. | |
| D487,383 | S | 3/2004 | Ng | |
| D487,384 | S | 3/2004 | Neitzell et al. | |
| 6,725,548 | B1 | 4/2004 | Kramer et al. | |
| 6,742,601 | B2 | 6/2004 | Numata | |
| 6,771,043 | B2 | 8/2004 | Matsunaga et al. | |
| 6,796,385 | B1 | 9/2004 | Cobzaru et al. | |
| 6,817,424 | B1 | 11/2004 | Su et al. | |
| D502,071 | S | 2/2005 | Snider | |
| 6,876,173 | B2 | 4/2005 | Mastaler et al. | |
| 6,933,689 | B2 | 8/2005 | Yamamoto | |
| 6,969,974 | B1 | 11/2005 | Liu | |
| 6,996,909 | B1 | 2/2006 | Buck et al. | |
| 7,005,831 | B2 | 2/2006 | Watson et al. | |
| D528,502 | S | 9/2006 | Fleetwood | |
| 7,105,249 | B2 | 9/2006 | Hall et al. | |
| D531,117 | S | 10/2006 | Schrick et al. | |
| 7,156,187 | B1 | 1/2007 | Townsan | |
| 7,157,882 | B2 * | 1/2007 | Johnson et al. | 320/134 |
| D539,217 | S | 3/2007 | Hamaguchi | |
| 7,207,233 | B2 | 4/2007 | Wadge | |
| D543,143 | S | 5/2007 | Hamaguchi | |
| D547,264 | S | 7/2007 | Kondo | |
| 2002/0011344 | A1 | 1/2002 | Alsruhe | |
| 2002/0022159 | A1 | 2/2002 | Pierson et al. | |
| 2002/0064041 | A1 | 5/2002 | Parker | |
| 2002/0089306 | A1 | 7/2002 | Kubale et al. | |
| 2002/0100597 | A1 | 8/2002 | Numata | |
| 2003/0010158 | A1 | 1/2003 | Listl et al. | |
| 2003/0095842 | A1 | 5/2003 | Bone | |
| 2003/0134187 | A1 | 7/2003 | Wheeler et al. | |
| 2003/0222607 | A1 * | 12/2003 | Simizu et al. | 318/139 |
| 2003/0224247 | A1 | 12/2003 | Wheeler et al. | |
| 2004/0069512 | A1 | 4/2004 | Ng | |
| 2004/0159172 | A1 | 8/2004 | Barkdoll | |

| | | | | |
|---|---|---|---|---|
| 2004/0231170 | A1 | 11/2004 | Neitzell et al. | |
| 2004/0232892 | A1 * | 11/2004 | Aradachi et al. | 320/150 |
| 2004/0257035 | A1 | 12/2004 | Chang | |
| 2004/0263119 | A1 | 12/2004 | Meyer et al. | |
| 2005/0115708 | A1 | 6/2005 | Jabusch | |
| 2005/0151507 | A1 | 7/2005 | Smith | |
| 2005/0196665 | A1 | 9/2005 | Shimizu et al. | |
| 2006/0070459 | A1 | 4/2006 | Kugler | |
| 2006/0071634 | A1 | 4/2006 | Meyer et al. | |
| 2006/0091858 | A1 | 5/2006 | Johnson et al. | |
| 2006/0103357 | A1 | 5/2006 | Johnson et al. | |
| 2006/0113956 | A1 | 6/2006 | Bublitz et al. | |
| 2006/0123941 | A1 | 6/2006 | Wadge | |
| 2007/0084616 | A1 | 4/2007 | Lam et al. | |

FOREIGN PATENT DOCUMENTS

| | | | |
|---|---|---|---|
| CN | 2355849 | Y | 12/1999 |
| CN | 1143757 | C | 5/2000 |
| CN | 2390728 | Y | 8/2000 |
| CN | 1267069 | A | 9/2000 |
| CN | 1135151 | C | 8/2001 |
| CN | 1317394 | A | 10/2001 |
| CN | 2471484 | Y | 1/2002 |
| CN | 2502850 | Y | 7/2002 |
| CN | 1370101 | A | 9/2002 |
| CN | 1419986 | A | 5/2003 |
| CN | 1421301 | A | 6/2003 |
| CN | 2644105 | Y | 9/2004 |
| CN | 1947957 | | 4/2007 |
| DE | 3625135 | | 2/1988 |
| DE | 3742268 | | 6/1989 |
| DE | 4116343 | | 11/1992 |
| EP | 0267472 | | 5/1988 |
| EP | 0422773 | | 4/1991 |
| EP | 0572327 | | 12/1993 |
| EP | 0768138 | | 4/1997 |
| EP | 1203628 | | 5/2002 |
| GB | 2026928 | | 2/1980 |
| GB | 2293056 | | 3/1996 |
| GB | 2385675 | | 8/2003 |
| JP | 2005138246 | | 6/2005 |
| WO | 9220491 | | 11/1992 |
| WO | 2007056172 | | 5/2007 |
| WO | 2007056254 | | 5/2007 |
| WO | 2007056255 | | 5/2007 |
| WO | 2007056370 | | 5/2007 |

OTHER PUBLICATIONS

Robert Bosch Tool Corporation, Bosch 11225VSRH Operating/Safety Instructions, English Version pp. 2-13, Printed in Germany, Nov. 2002.

Panasonic Catalog on website featuring EY503B—2.4V Cordless Drill & Driver, Apr. 28, 2005.

Panasonic Catalog on website featuring EY6225CQ—3.6V Cordless Drill & Driver, Apr. 28, 2005.

Panasonic Catalog on website featuring EY6220B—2.4V Cordless Drill & Driver with 15-minute charging system, Apr. 28, 2005.

* cited by examiner

POWER TOOL INCLUDING A FUEL GAUGE AND METHOD OF OPERATING THE SAME

REFERENCE TO RELATED APPLICATION

This application claims priority under 35 U.S.C. § 119 to Provisional Patent Application No. 60/682,192 filed on May 17, 2005, the entire contents of which is hereby incorporated by reference.

The present application incorporates by reference the entire contents of U.S. patent application Ser. No. 11/435,645, filed May 17, 2006.

BACKGROUND

The present invention relates generally to power tools, and more particularly to rotary power tools, such as drills and screwdrivers.

Power tools, such as rotary power tools, are used to work on or cut a variety of workpieces, such as metal, wood, drywall, etc. Such tools typically include a housing, a motor supported by the housing and connectable to a power source, and a spindle rotatably supported by the housing and selectively driven by the motor. A tool holder, such as a chuck, is mounted on the forward end of the spindle, and a tool element, such as, for example, a drill bit, is mounted in the chuck for rotation with the chuck and with the spindle to operate on a workpiece.

SUMMARY

In some embodiments, the invention provides a method of operating a power tool. The power tool can include a housing supporting a motor, a switch assembly, and a fuel gauge. The method can include the acts of activating the switch assembly to electrically connect the motor and a battery, recording a state of charge of the battery, displaying the state of charge of the battery on the fuel gauge before electrically connecting the motor and the battery, and stopping the display of the state of charge before deactivating the switch assembly.

In other embodiments, the invention provides a method of operating a power tool including a housing supporting a motor and a fuel gauge. The method can include the acts of connecting a battery to the housing, the battery having an at rest state of charge, displaying the at rest state of charge of the battery on the fuel gauge, and activating the motor and continuing to display the at rest state of charge of the battery on the fuel gauge.

The invention also provides a power tool including a movable spindle for supporting a tool element, and a housing supporting a motor and a drive mechanism driven by the motor. The drive mechanism can be operably connected to the spindle for causing movement of the spindle relative to the housing. The housing can have a forward end supporting the spindle and a rearward end. The power tool can also include a battery connectable to the rearward end, and a fuel gauge supported on the housing for displaying an at rest state of charge of the battery.

In some embodiments, the invention provides a method of operating a battery charger. The battery charger can include a body defining an aperture and a charging circuit extending through the body. The method can include the acts of inserting a battery into the aperture along an insertion axis, electrically connecting the battery to the charging circuit to charge the battery and pivoting the battery about the axis relative to the battery charger to secure the battery in the battery charger.

In other embodiments, the invention provides a method of operating a battery charger. The battery charger can include a body and a charging circuit. One of the charger and the battery can include an outwardly extending protrusion, and the other of the charger and the battery can define a recess for receiving the outwardly extending protrusion. The method can include the acts of electrically connecting the battery and the charging circuit to charge the battery before engaging the protrusion in the recess to secure the battery to the body of the charger.

In other embodiments, the invention provides a method of operating a battery charger. The battery charger can include a body and a charging circuit extending through the body. The method can include the acts of electrically connecting the battery to the charging circuit to charge the battery, and moving the battery with respect to the battery charger to secure the battery to the body while continuing to charge the battery.

The invention also provides a combination of a battery and a battery charger. The battery can include a casing and a battery cell supported in the casing. The battery charger can include a body and a charging circuit. One of the charger and the battery can include an outwardly extending protrusion, and the other of the charger and the battery can define a recess for receiving the outwardly extending protrusion. The battery can be movable relative to the body of the charger between a locked position, in which the protrusion can lockingly engage the recess, and an unlocked position, in which the protrusion can removably engage the recess. The battery cell can be electrically connectable to the charging circuit of the battery charger when the battery is in the locked position and the unlocked position.

Other aspects of the invention will become apparent by consideration of the detailed description and accompanying drawings.

Before any embodiments of the invention are explained in detail, it is to be understood that the invention is not limited in its application to the details of embodiment and the arrangement of components set forth in the following description or illustrated in the following drawing. The invention is capable of other embodiments and of being practiced or of being carried out in various ways. Also, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items. Unless specified or limited otherwise, the terms "mounted," "connected," "supported," and "coupled" and variations thereof are used broadly and encompass both direct and indirect mountings, connections, supports, and couplings. Further, "connected" and "coupled" are not restricted to physical or mechanical connections or couplings.

DETAILED DESCRIPTION

Figure 1:
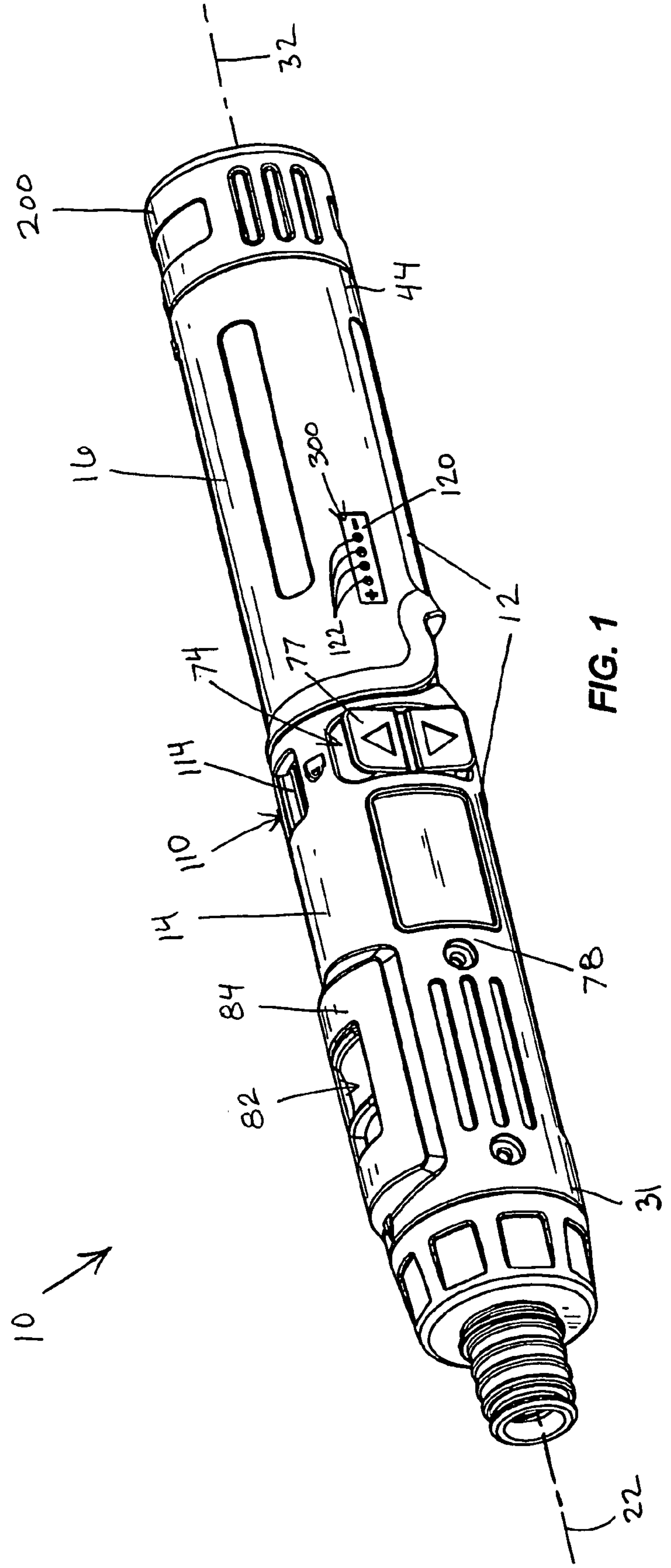
FIG. 1 is a front perspective view of a power tool according to an embodiment of the invention.

FIGS. 1-5 illustrate a hand-held, battery-operated power tool 10, such as, for example, a screwdriver, a drill, or another rotary tool. The power tool 10 is operable to receive power from a battery, such as the battery 200 shown in FIGS. 6-9C. In other embodiments, the power tool 10 can be another hand-held power tool, such as, for example, a reciprocating saw, a hammer drill, a router, a circular saw, a grinder, a sander, etc.

The power tool 10 includes a housing assembly 12 having a body 14 and a main operator's handle portion or hand grip 16 connected to a rearward portion 18 of the body 14.

The body 14 defines a longitudinal body axis 22 and houses a drive mechanism 26, a motor 28, and a spindle 30 supported by a forward end 31 of the body 14. Together, the drive mechanism 26, the motor 28, and the spindle 30 are operable to rotate a tool element (not shown) generally about a tool axis for working on a workpiece (also not shown). In other embodiments, the drive mechanism 26, the motor 28, and the spindle 30 can also or alternatively reciprocate the tool element along the tool axis for working on a workpiece.

In the illustrated embodiment of FIGS. 1-5, the spindle 30 is a tool-less spindle, which can accept and lockingly engage the tool element. The tool element is secured to the spindle 30 by a ball-detent arrangement and requires no tools for tool element insertion or removal. In other embodiments, a chuck, collets, a blade clamp, adapters, or other conventional connecting structure may be used to secure a tool element to the spindle 30.

As shown in FIGS. 1-5, the hand grip 16 is pivotably connected to the rearward portion 18 of the body 14 rearwardly of the motor 28. The hand grip 16 defines a grip axis 32 and is supported for pivoting movement relative to the body 14 about a pivot axis 34. In the illustrated embodiment, the pivot axis 34 is substantially perpendicular to both the body axis 22 and the grip axis 32.

In other embodiments (not shown), the orientation of the axes 22, 32, and 34 may be different, such as, for example, generally parallel or skew. Also, the hand grip 16 may be movable in other manners, such as, for example, slidably, rotatably, or pivotably about two axes (i.e., about the pivot axis 34 and about an axis parallel to the body axis 22 and/or to the grip axis 32).

Figure 3:
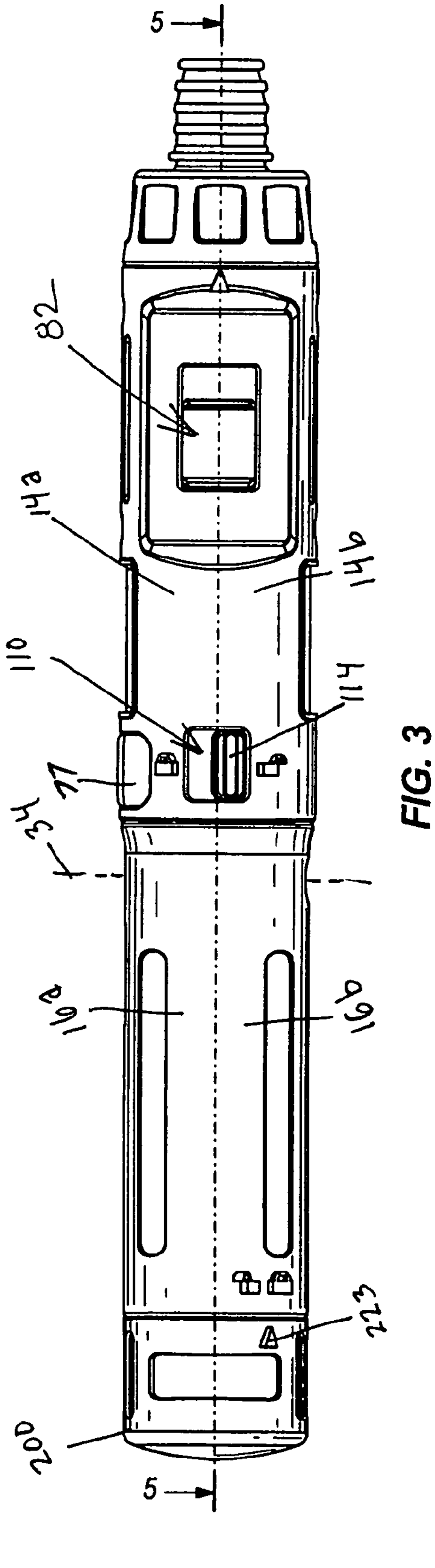
FIG. 3 is a top view of the power tool shown in FIG. 1.
Figure 4:
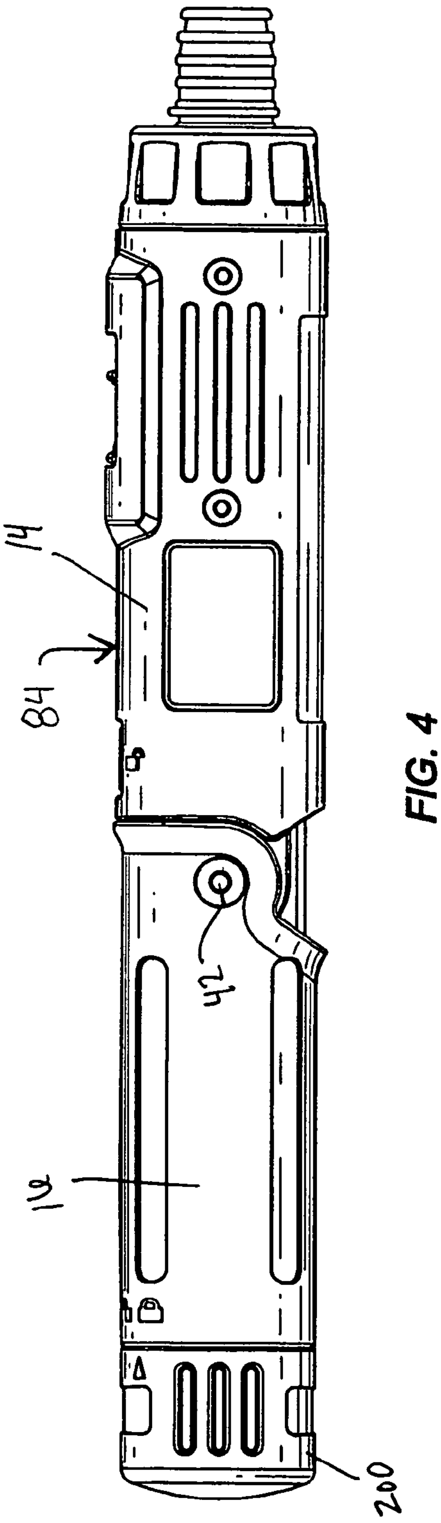
FIG. 4 is a right side view of the power tool shown in FIG. 1.
Figure 5:
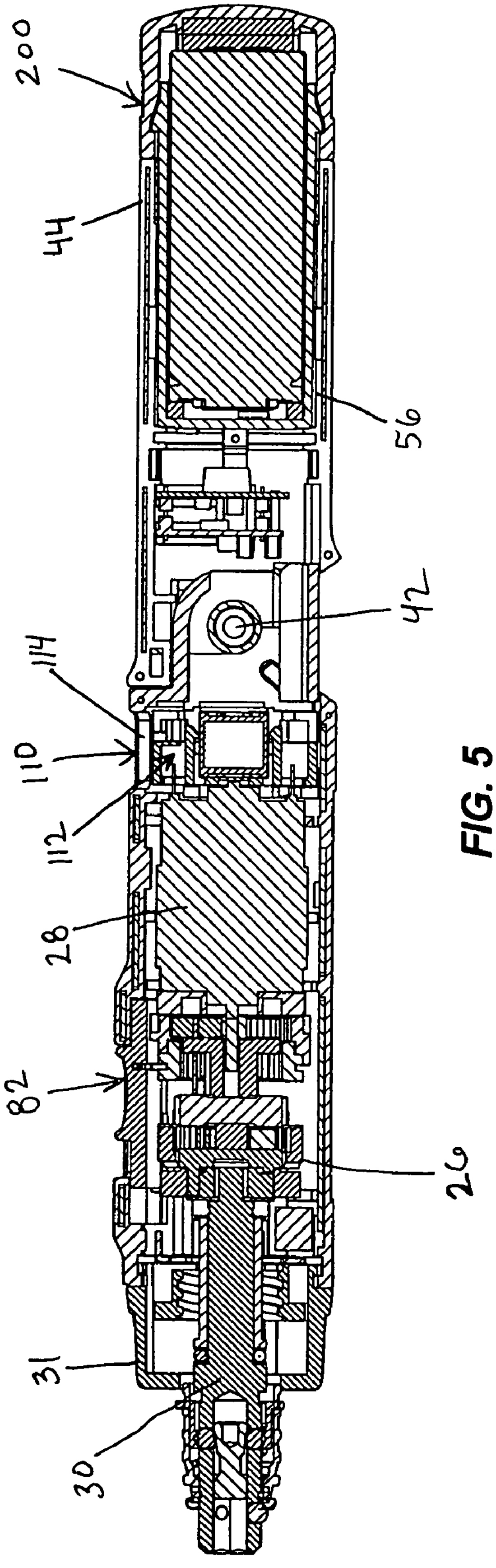
FIG. 5 is a section view of the power tool taken along line 5-5 of FIG. 3.

In some embodiments, the body 14 is formed of two body halves **14*a*, 14*b* (see FIG. 3). Similarly, the hand grip 16 is formed of two grip halves 16*a*, 16*b* (also shown in FIG. 3). In these embodiments, a first end 40 of the hand grip 16 sandwiches the rearward portion 18 of the body 14. A pivot pin 42, defining the pivot axis 34, extends through the first end 40 of the hand grip 16 and through the rearward portion 18 of the body 14 to pivotally connect the hand grip 16 to the body 14**.

The hand grip 16 is movable relative to the body 14 between a first position (shown if FIG. 1), in which the body axis 22 and the grip axis 32 are generally aligned and are substantially parallel, and a second position (shown in FIG. 2), in which the grip axis 32 is misaligned with the body axis 22. In the second position, the hand grip 16 is positioned so that the grip axis 32 and the body axis 22 define an angle $\alpha$ of between about 90 degrees and about 135 degrees. The hand grip 16 may also be movable to one or more positions between the first and second positions.

Also, the hand grip 16 is pivotable relative to the body 14 to change the length of the power tool 10, measured from a forward end 31 of the body 14 to a rearward end 44 of the hand grip 16. In the position shown in FIG. 1, the power tool 10 has a first length measured between the forward end 31 of the body 14 and the rearward end 44 of the hand grip 16. In the position shown in FIG. 2, the power tool 10 has a second shorter length measured between the forward end 31 of the body 14 and the rearward end 44 of the hand grip 16.

Figure 21:
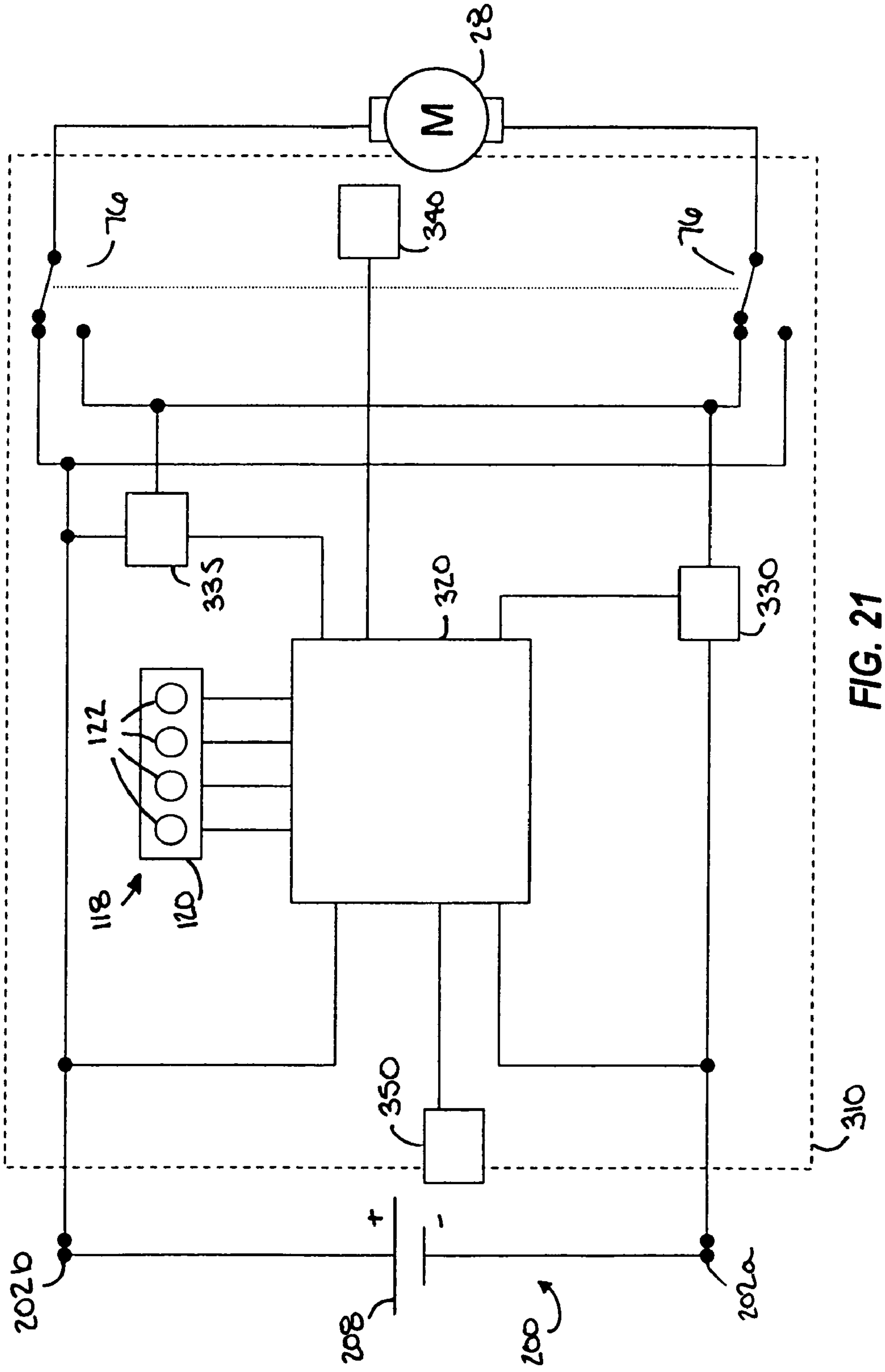
FIG. 21 is a schematic illustration of the power tool shown in FIG. 1.

With respect to the illustrated embodiment of FIGS. 1-5, the motor 28 is an electric motor that is connectable to a power source, such as the battery 200, by an electrical circuit 310 (shown schematically in FIG. 21). The battery 200 is removably supported in a battery chamber 56 extending through the rearward end 44 of the hand grip 16 and is slidably attached to the hand grip 16 in a direction generally parallel to the grip axis 32. In other embodiments, the hand grip 16 can support two or more batteries 200 in a battery chamber 56, or alternatively, the battery(ies) 200 can be slidably connected to an outer engagement surface of the hand grip 16.

The power tool 10 includes an on/off switch assembly 74 which is operable to connect the motor 28 to the power source. In the illustrated embodiment of FIGS. 1-5, the switch assembly 74 includes a direction switch 76 (shown in FIG. 21) having a trigger 77 supported on a side surface 78 of the body 14 for operation by the thumb or finger of either a right-handed or a left-handed operator. In the illustrated embodiment, the trigger 77 is positioned toward the rear of the body 14, near the hand grip 16. As shown in FIGS. 1-5, at least a portion of the switch assembly 74, such as the trigger 77, is movable with the body 14 relative to the hand grip 16 during pivoting movement of the hand grip 16.

In other embodiments (not shown), the power and direction of rotation of the motor 28 may be controlled by other elements and structure. In one such alternate embodiment, a single trigger can be actuated to cause the motor shaft 58 to rotate relative to the body 14. The direction of rotation of the motor shaft 58 can be controlled by a separate direction switch, which may be operable between a "forward" position and a "reverse" position, and may additionally be provided with a lockout feature to prevent actuation of the trigger and energization of the motor 28.

In some embodiments, the power tool 10 can include a speed control mechanism 82, which is operable to adjust the rotational speed of a tool element supported by the power tool 10 and/or the rotational speed of the spindle 30 between two or more different rotational speeds (e.g., a high speed, a low speed, and intermediate speeds). As shown in FIGS. 1-5, the speed control mechanism 82 can be supported on an upper surface 84 of the body 14 and can be operable to move the drive mechanism 26 between a first configuration, in which elements of the drive mechanism 26 are oriented to rotate a tool element and/or the spindle 30 about the tool axis at a first rotational speed, and a second configuration, in which elements of the drive mechanism 26 are oriented to rotate a tool element about the tool axis at a second, different rotational speed. In other embodiments, the speed control mechanism 82 may be operable to control the power supplied by the power source (e.g., the battery 200) to the motor 28 to rotate the motor shaft 58 at a first rotational speed and a second, different rotational speed.

As shown in FIGS. 1-5, the power tool 10 also includes a locking assembly 110 for locking the hand grip 16 in a position relative to the body 14. The locking assembly 110 is operable between a locked position, in which the hand grip 16 is fixed in a position relative to the body 14, and an unlocked position, in which the position of the hand grip 16 relative to the body 14 is adjustable. In some embodiments, the locking assembly 110 may be substantially similar to that disclosed in U.S. patent application Ser. No. 09/704,914, filed Nov. 2, 2000 and/or U.S. patent application Ser. No. 10/796,365, filed Mar. 9, 2004, the entire contents of each of which is hereby incorporated by reference.

In the illustrated embodiment, the locking assembly 110 includes a detent arrangement between the hand grip 16 and the body 14 to provide a positive engagement between the hand grip 16 and the body 14. The locking assembly 110 includes a locking member 112, a portion of which is selectively engageable in a first recess, to fix the hand grip 16 in the first position relative to the body 14, and a second recess, to fix the hand grip 16 in the second position relative to the body 14. The locking assembly 110 can also include additional recesses in which the locking member 112 can be engageable to fix the hand grip 16 in additional positions relative to the body 14.

The locking assembly 110 can also include an actuator 114 for moving the locking member 112 between the locked and unlocked positions. In the illustrated embodiment of FIGS. 1-5, the actuator 114 is positioned on an upper surface 84 of the body 14 for operation by the thumb or finger of either a right-handed or a left-handed operator. A portion of the actuator 114 extends through the housing 12 and is selectively engageable with the locking member 112 to move the locking member 112 between the locked and unlocked positions. In some embodiments, the locking assembly 110 can include a biasing member, such as a spring, for biasing the locking member 112 toward the locked position, or alternatively, for biasing the locking member 112 toward the unlocked position.

To move the hand grip 16 relative to the body 14, the actuator 114 is operated to move the locking projection 114 out of engagement with the recesses. The hand grip 16 is then moved relative to the body 14 to a position corresponding to engagement of the locking projection 114 with one of the recesses. When the hand grip 16 is in the desired position, the locking projection 114 is moved (e.g., by a spring) into the corresponding recess.

In other embodiments (not shown), the locking assembly 110 may include a different locking arrangement, such as a frictional engagement between the hand grip 16 and the body 14. In such an embodiment, the locking assembly 110 may also include a positive engagement arrangement, such as inter-engaging teeth formed on the body 14 and the hand grip 16 which are engaged when the locking assembly 110 is in the locked condition.

The locking assembly 110 may also include a pivoting lockout, which prevents the hand grip 16 from being pivoted about the pivot axis 34 relative to the body 14 when the motor 28 is in operation and/or when the switch assembly 74 is activated.

Figure 2:
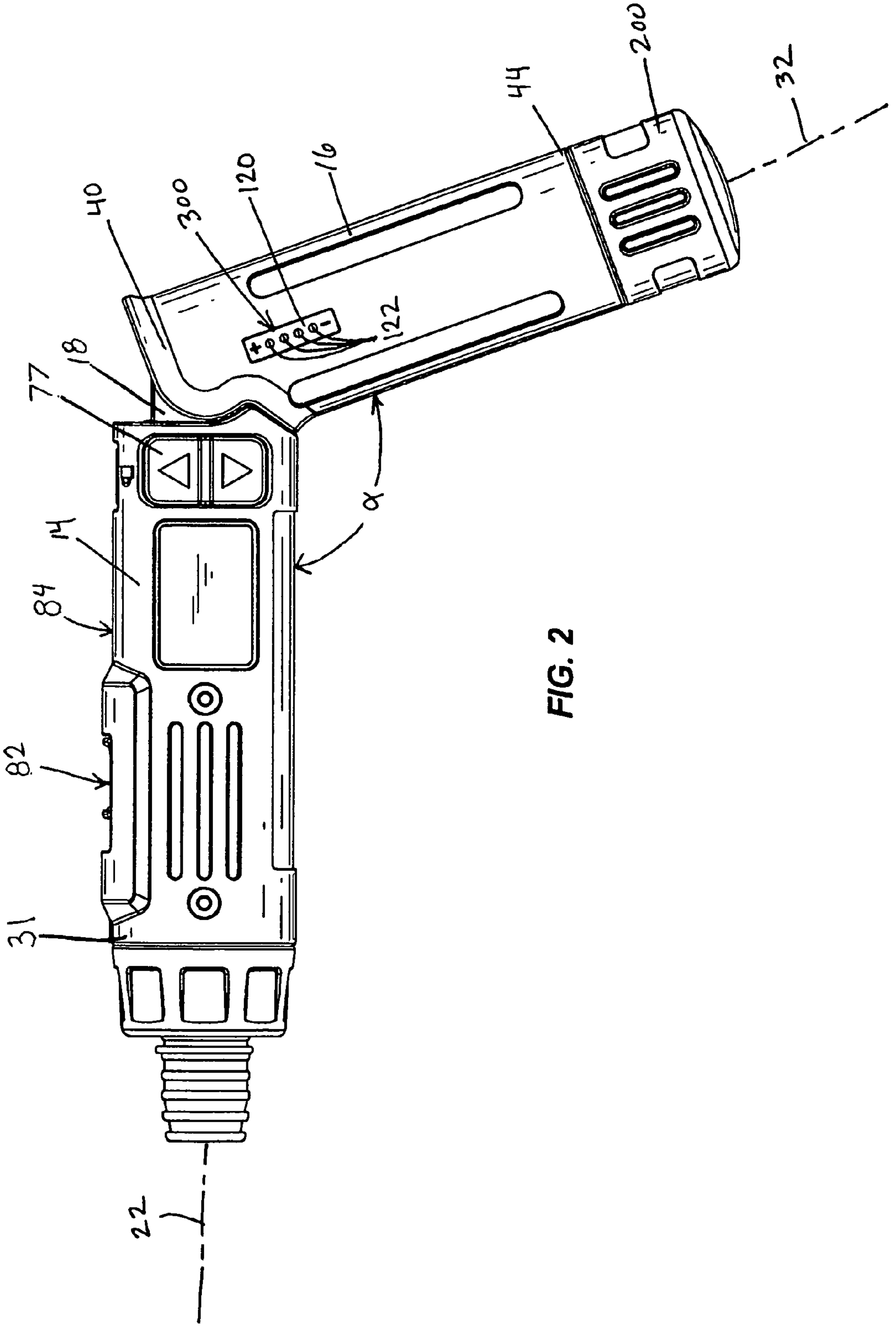
FIG. 2 is a left side view of the power tool shown in FIG. 1.

The power tool 10 can also include a fuel gauge 118 for displaying a state of charge of the battery 200 supported in the battery chamber 56. As shown in FIGS. 1 and 2, the fuel gauge 118 can include a display 120 positioned on a side of the hand grip 16. In some embodiments, such as the illustrated embodiment of FIGS. 1 and 2, the display 120 can include a series of indicator lights 122 (e.g., light-emitting diodes) arranged to form a scale. In these embodiments a number of indicator lights 122 can be illuminated when the battery state of charge is high and one or no lights can be illuminated to show that the battery state of charge is low. In other embodiments, one light can flash to show that the battery state of charge is low. In further embodiments, the display 120 can include other display screens and/or indicator lights having other relative orientations and positions and can include indicator lights of different colors (e.g., green, blue, yellow, orange, and red) for displaying the state of charge of the battery 200. In still further embodiments, the display 120 can be used to inform the user of other conditions, such as, for example, abnormal (high or low) battery temperature, an electrical fault within the electrical circuit 310, or other information pertaining to the battery 200 or tool 10.

In some embodiments, such as the embodiment shown in FIG. 21, the electrical circuit 310 includes a controller 320. The controller 320 can perform various functions within the tool 10, such as, for example, measuring various battery conditions (e.g., state of charge of battery cell 208), controlling various components included in the circuit 310 (e.g., the fuel gauge 118), controlling operation of the power tool 10, and gathering and storing data pertaining to tool operation, battery conditions, and component operation within the circuit 310. In other embodiments, the controller 320 and/or electrical circuit 310 can include similar components and/or perform similar functions as the battery controllers and electrical circuits shown and described in U.S. patent application Ser. No. 10/720,027, filed Nov. 20, 2003 and U.S. patent application Ser. No. 11/138,070, filed May 24, 2005, the entire contents of each of which is hereby incorporated by reference.

In some embodiments, the controller 320 is programmed to measure state of charge in response to the activation of the trigger 77, as discussed below. In these embodiments, the battery state of charge data is measured prior to activation of the motor 28; that is, before the battery state of charge is effected by the current draw being supplied to the motor 28. This measurement of the battery state of charge represents an at rest state of charge of the battery 200. In these embodiments, only the at rest state of charge measurements are displayed on the fuel gauge 118. In some embodiments, the state of charge data is displayed for a predetermined time after the trigger 77 is actuated. In one embodiment, the predetermined time is approximately two (2) seconds. In other embodiments, the predetermined time can be greater than two (2) seconds. In further embodiments, the predetermined time can be less than two (2) seconds. After the predetermined time is exceeded, the display 120 can be cleared. In one embodiment, the display 120 is cleared when the predetermined time expires regardless whether the trigger 77 is still actuated. In some embodiments, the display 120 is cleared when the predetermined time expires regardless of the trigger 77 activity. In still further embodiments, the display 120 is cleared prior to expiration of the predetermined time (e.g., approximately two (2) seconds) when the trigger 77 is released.

The circuit 310 also includes the direction switch 76 which controls and/or selects the rotational direction of the motor shaft 58. The circuit 310 also includes an on/off switch 330, a brake 335, a mechanical torque clutch 340 and a temperature sensing device or thermistor 350. In some embodiments, the on/off switch 330 and the brake 335 can include a field effect transistor, such as a MOSFET.

The on/off switch 330 is controlled by the controller 320 and activated by the controller 320 under various conditions. For example, the controller 320 activates the on/off switch 330 to a conducting state for power to be delivered to the motor 28 in response to activation of the trigger 77. The controller 320 can also activate the switch 330 to a non-conducting state to interrupt current being supplied to the motor 28 when the state of charge of the battery 200 reaches a cut-off threshold or when an overload condition is sensed by the controller 320. In some embodiments, an overload condition can occur when the temperature of the battery 200 as sensed by the controller 320 via the thermistor 350 reaches a high temperature threshold or when the current being supplied to the motor 320 reaches a high current threshold. In these embodiments, the controller 320 can indicate to a user that an overload condition has occurred via the display 120, such as flashing one or more lights 122.

The brake 335 is controlled by the controller 320 and activated by the controller 320 when the torque of the motor 28 exceeds the torque setting of the tool 10 as sensed by controller 320 via the clutch 340.

As shown in FIGS. 1-10, the battery 200 of the illustrated embodiment is substantially cylindrically shaped and has a substantially circular cross-section. In other embodiments, the battery 200 can have any other shape and/or cross-sectional shape, including without limitation rectangular, oval, polygonal, irregular, etc.

In the illustrated embodiment of FIGS. 1-10, the battery 200 includes a battery sleeve or casing 204 and a battery cell 208 supported in the battery casing 204. The battery 200 can also include a cap 206, which can be secured to a second end 205 of the battery casing 204 to substantially enclose the battery cell 208. In other embodiments, the battery 200 can include two or more battery cells 208 arranged in various combinations of serial and parallel cell arrangements.

In the illustrated embodiment of FIGS. 1-10, the battery 200 includes a single battery cell 208 having a nominal voltage rating of approximately 4.0 volts (V) and a capacity of approximately 3.0 Ampere-hours (Ah). In this embodiment, the battery cell 208 also has a Lithium-based chemistry, such as, for example a Li-ion chemistry. The Lithium-based chemistry can include various Li-ion chemistries, such as, for example, Lithium Cobalt, Lithium Manganese ("Li—Mn") Spinel, or Li—Mn Nickel.

As shown in FIGS. 6-9D, contact recesses 216*a*, 216*b* extend radially through a first end 203 of the casing 204. In the illustrated embodiment, the contact recesses 216*a*, 216*b* are generally L-shaped. In other embodiments, one or both of the contact recesses 216*a*, 216*b* can have other shapes and can be positioned in other locations along the battery casing 204.

The battery 200 also includes a first (e.g., a negative) battery terminal 202*a* and second (e.g., a positive) battery terminal 202*b*, portions of which are accessible through the contact recesses 216*a*, 216*b* to electrically connect the battery cell 208 to the corresponding electrical terminals (not shown) of the power tool 10, or alternatively, to the electrical terminals (not shown) of a battery charger. In some embodiments, the battery terminals 202*a* and 202*b* can also or alternatively at least partially physically connect the battery 200 to the hand grip 16 of the power tool 10.

As shown in FIGS. 6-9D, the battery terminals 202*a*, 202*b* are equally spaced circumferentially (e.g., approximately 180 degrees apart) around a front end of the battery cell 208. In other embodiments, the battery terminals 202*a*, 202*b* can have other orientations and locations, depending in part on the location and orientation of the contact recesses 216*a*, 216*b*.

In the illustrated embodiment, when a battery 200 is inserted into the battery chamber 56 of a power tool 10, the battery 200 can be pivoted about the battery axis 201, which can be coincident with the grip axis 32 so that the first battery terminal 202*a* of the battery 200 wipes across the electrical terminal of the power tool, cleaning the battery terminal 202*a* of the battery 200 and the corresponding power tool terminal before an electrical connection is established between the battery 200 and the power tool 10.

Similarly, the second battery terminal 202*b* of the battery 200 can be wiped across the electrical terminal of the power tool, cleaning the electrical connector 202*b* of the battery 200 and the corresponding power tool terminal. In this manner, the first and second battery terminals 202*a*, 202*b* of the battery 200 and the first and second terminals of the power tool are cleaned each time a battery 200 is electrically connected to the power tool 10 and/or each time a battery 200 is disconnected from the power tool 10.

In the illustrated embodiment of FIGS. 6-9D, a retainer clip 210 is supported in the battery casing 204 and is operable to position and retain the battery terminals 202*a*, 202*b* and the battery cell 208 in their respective locations and orientations within the battery casing 204. In the illustrated embodiment, the retainer clip 210 includes a radially outwardly extending projection 211, which is engageable in a recess (not shown) in the battery casing 204 to orient the retainer clip 210 in a predetermined orientation in the battery casing 204.

Figure 10:
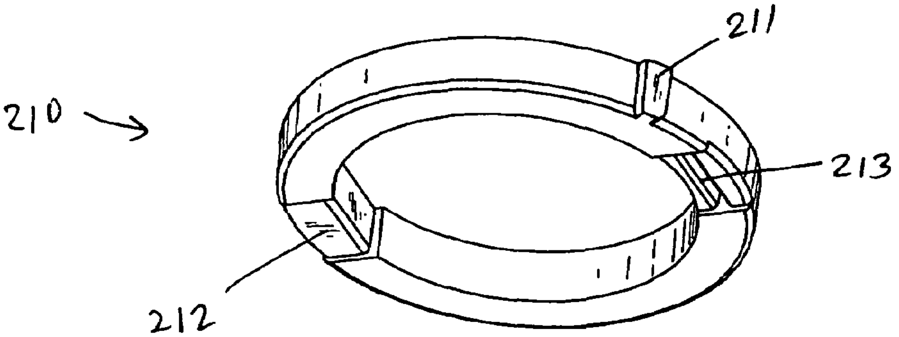
FIG. 10 is a perspective view of a retainer clip.

As shown in FIG. 10, the retainer clip 210 can also include two recesses 212, 213 for receiving portions of the battery terminals 202*a*, 202*b*, respectively. Thus, when assembled with the retainer clip 210, the battery terminals 202*a*, 202*b* are fixed in a predetermined circumferential orientation with respect to the battery casing 204.

In the illustrated embodiment of FIGS. 6-9D, an insulator 214 (e.g., a foam insert) is located between a front end of the battery cell 208 and the cap 206. In this embodiment, the cap 206 is positioned over the insulator 214 and secured to the battery casing 204 by a pair of cap-retaining retaining barbs 215, which extend radially outwardly from the casing 204. In other embodiments, the cap 206 can be connected to the casing 204 via screws, bolts, nails, rivets, pins, posts, clips, clamps, and/or other conventional fasteners, inter-engaging elements on the cap 206 and the casing 204 (e.g., tabs, flanges, or other extensions inserted within slots, grooves, or other apertures, etc.), by adhesive or cohesive bonding material, or in any other suitable manner.

In some embodiments, the battery 200 includes a locking arrangement 220 for locking the battery 200 in the battery chamber 56 of the power tool 10. In the illustrated embodiment of FIGS. 6-9D, the locking arrangement 220 includes first and second lugs 222*a*, 222*b*, which extend radially outwardly from the casing 204 of the battery 200.

Figure 6:
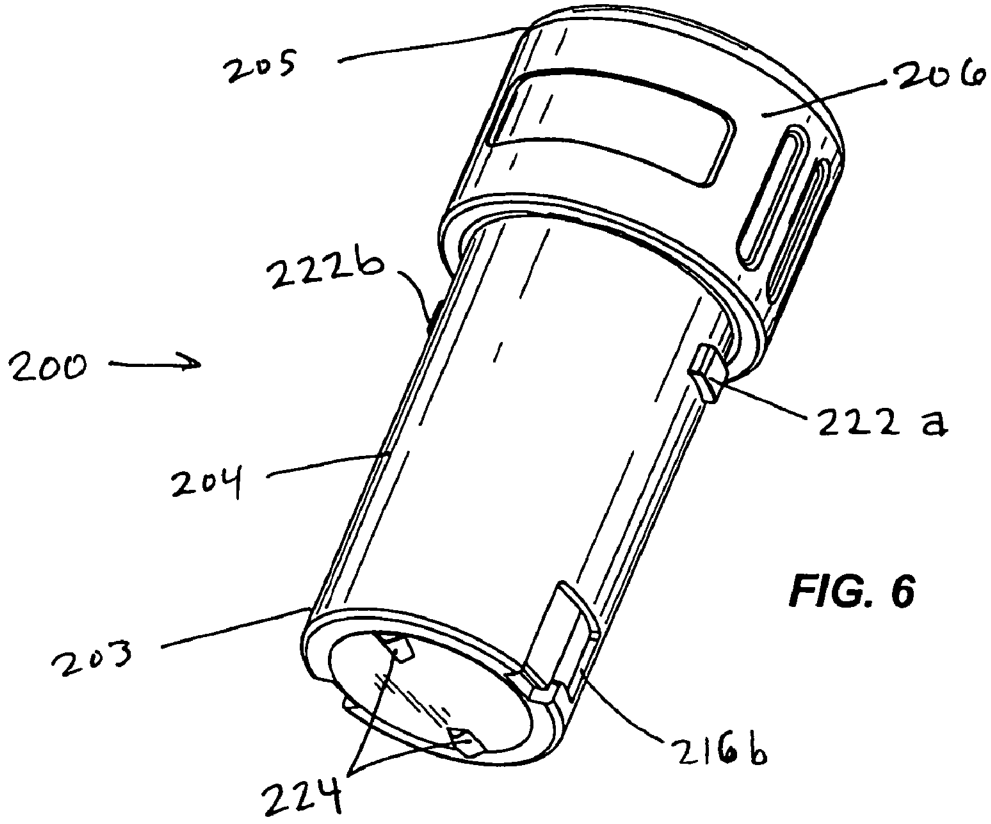
FIG. 6 is a perspective view of a battery according to an embodiment of the invention.
Figure 8:
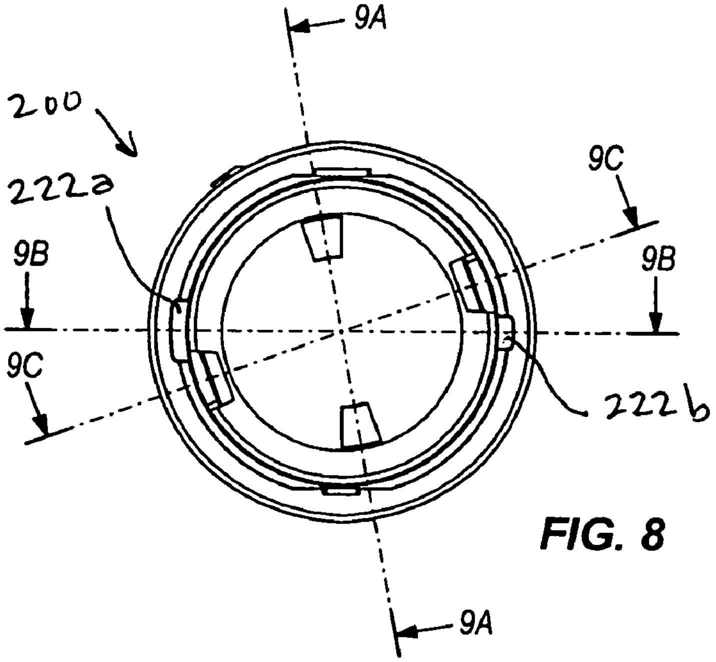
FIG. 8 is a front view of the battery shown in FIG. 6.
Figure 7:
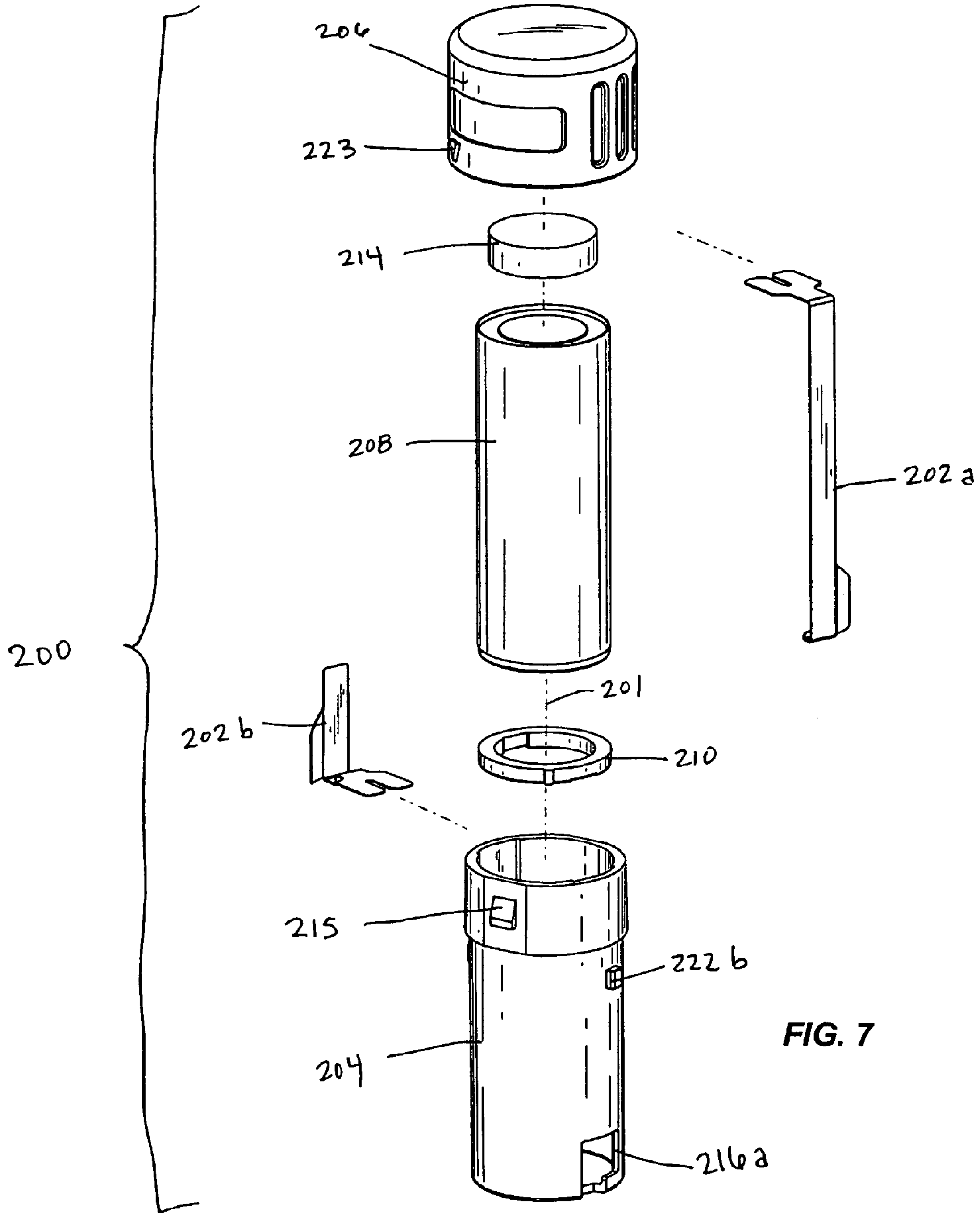
FIG. 7 is an exploded view of the battery shown in FIG. 6.
Figure 9C:
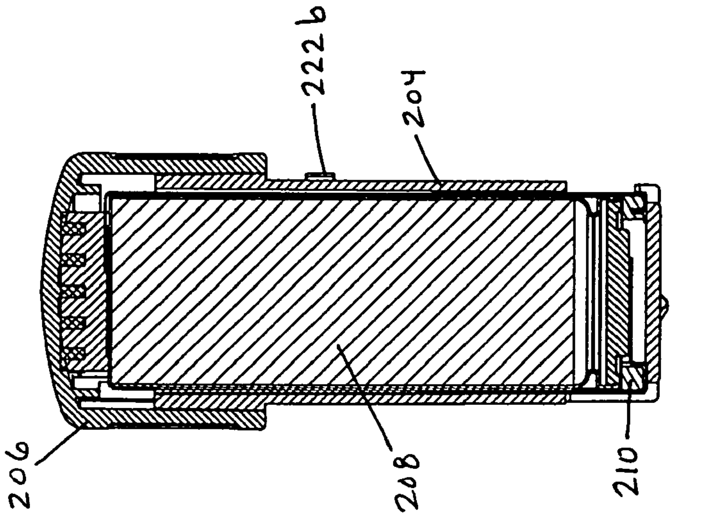
FIG. 9C is a section view of the battery taken along line C-C of FIG. 8.
Figure 9B:
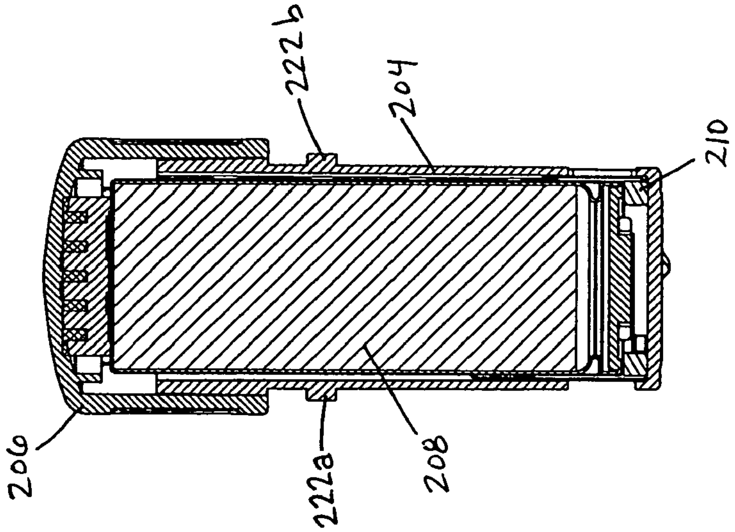
FIG. 9B is a section view of the battery taken along line B-B of FIG. 8.
Figure 9A:
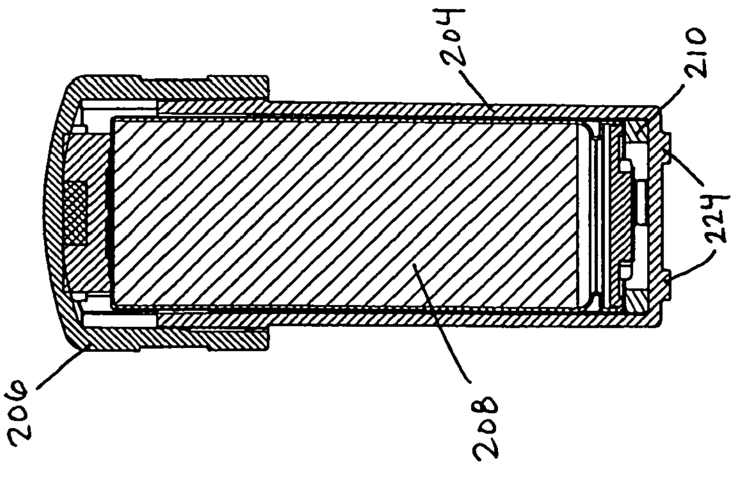
FIG. 9A is a section view of the battery taken along line A-A of FIG. 8.
Figure 9D:
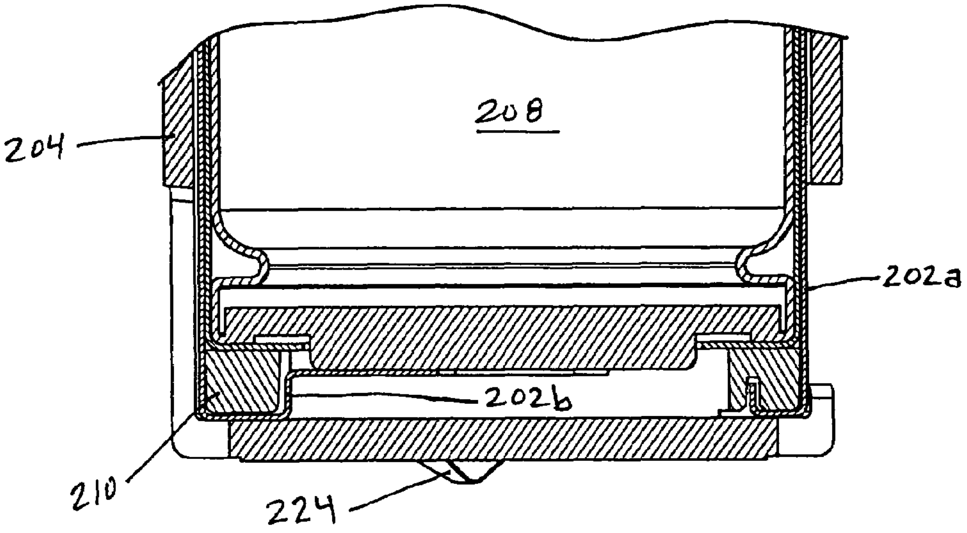
FIG. 9D is a detail view of the electrical connection between the battery and the charger shown in FIG. 9C.

As shown in FIGS. 6-8, the first and second lugs 222*a*, 222*b* each have generally rectangular cross-sectional shapes, and the first lug 222*a* is larger in size than the second lug 222*b*. In other embodiments, the first and second lugs 222*a*, 222*b* can have any other shape and/or cross-sectional shape, including without limitation round, oval, polygonal, irregular, etc.

Corresponding slots extend axially along the sides of the battery chamber 56 of the power tool 10. One of these slots is sized and shaped to receive the first lug 222*a* and the other slot is sized and shaped to receive the second lug 222*b*, thereby ensuring that the battery 200 can only be inserted into the power tool 10 in a single desired orientation (i.e., with the battery terminals 202*a*, 202*b* of the battery 200 aligned with and electrically connected to corresponding terminals of the power tool 10).

In some such embodiments, the slots extend axially along the inner wall of the battery chamber 56 of the power tool 10 and include lower ends which extend circumferentially around at least a portion of the inner wall of the battery chamber 56. In these embodiments, the slots are substantially L-shaped. In this manner, after the battery 200 is inserted axially into the battery chamber 56 of the power tool 10, the battery 200 can be pivoted about the battery axis 201 and relative to the housing 12 to lockingly engage the lugs 222*a*, 222*b* in the respective L-shaped receiving slots to lockingly connect the battery 200 to the power tool 10. In other embodiments (not shown), the locking arrangement 220 may include a single lug and a single receiving slot.

As shown in FIGS. 6-9D, the battery 200 can also include axially extending projections 224 located on the front end of the battery 200 opposite the cap 206. The projections 224 can be engageable with a complementary part(s) in the battery chamber 56 to provide tactile and/or audible feedback to the operator upon rotation of the battery 200 relative to the hand grip 16. In other embodiments, the battery 200 can have a single projection 224 or more than two projections 224, which can be placed on the battery casing 204 at various locations for engagement with the battery chamber 56. In other embodiments, the projections 224 can be engageable with a complementary part(s) in a battery charger 400 to provide tactile and/or audible feedback to the operator upon rotation of the battery 200 relative to the battery charger 400.

As shown in FIGS. 11A-20, the battery 200 is engageable in a battery charger 400, which is operable to charge one or more battery(ies) 200. In some embodiments, AC current from an electrical source (e.g., a land-based power network) can be provided through a charging circuit 401 to a battery 200 supported on the charger 400. In some embodiments, the charging circuit 401 may convert AC power to DC power. In other embodiments, the battery charger 400 can provide power to the battery 200 from an unconventional power source including supplementary batteries and various AC and DC sources. In some such embodiments, the charging circuit 401 can include AC/DC converting components and can also or alternatively provide current and/or voltage limiting functions, signal conditioning, and the like.

The charging circuit 401 can include similar components and implement similar charging algorithms as the charging circuits shown and described in U.S. patent application Ser. No. 10/719,680, filed Nov. 20, 2003, U.S. patent application Ser. No. 11/139,020, filed May 24, 2005, and U.S. patent application Ser. No. 11/266,007, filed Nov. 2, 2005, the entire contents of each of which is hereby incorporated by reference.

In the illustrated embodiment of FIGS. 11A-20, the charger 400 includes a charger casing or body 402 having an upper portion 402*a* and a lower portion 402*b*. As shown in FIGS. 11A-20, the casing 402 can define a battery chamber 403 and can include an opening 404 for receiving batteries 200. In the illustrated embodiment, the opening 404 is located generally toward the front end 406 of the charger 400. A rear portion 408 of the charger 400 is provided with an electrical input receptacle 410 for receiving a cord or plug.

Figure 11A:
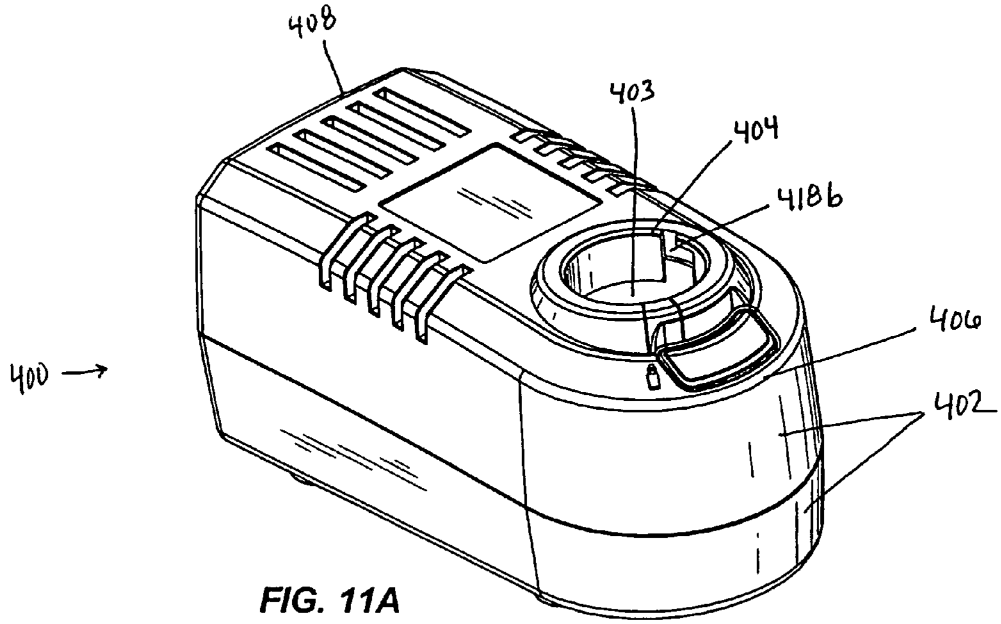
FIG. 11A is a first perspective view of a charger according to an embodiment of the invention.
Figure 11B:
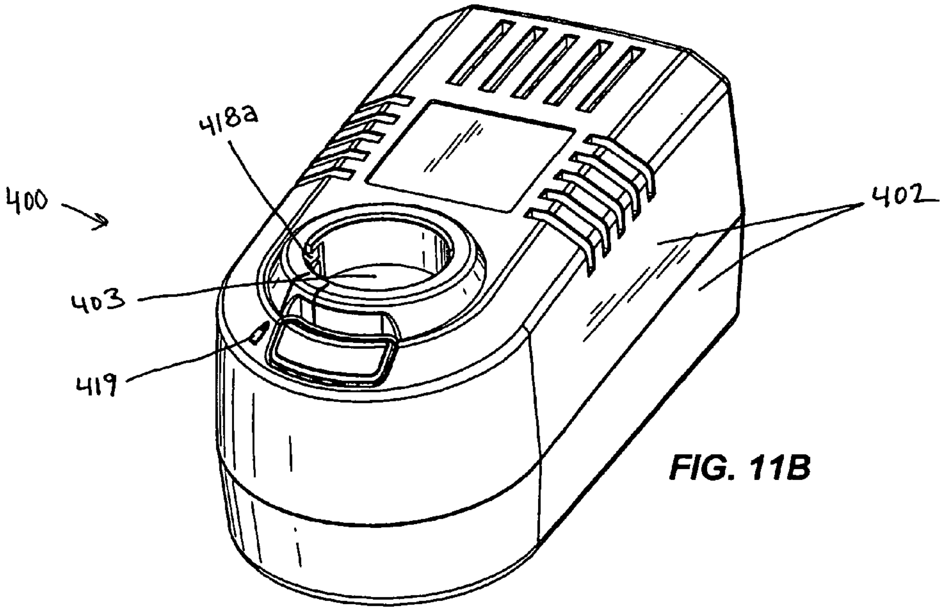
FIG. 11B is a second perspective view of the charger shown in FIG. 11A.
Figure 12:
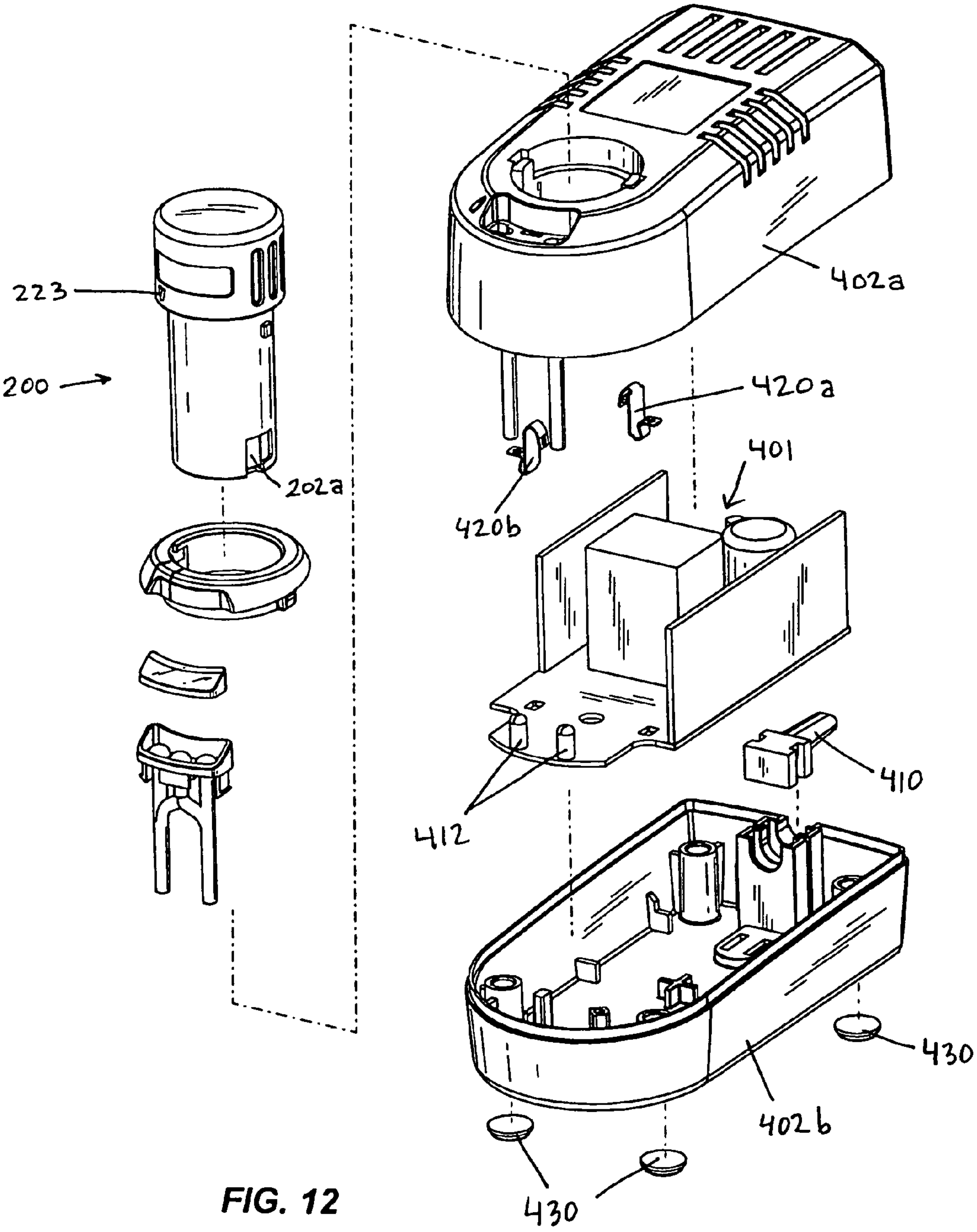
FIG. 12 is an exploded view of a battery and the charger shown in FIG. 11A.

As best shown in FIGS. 11A and 11B, first and second receiving slots 418*a*, 418*b* extend through the charger casing 402 on opposite sides of the opening 404 and are sized to engage portions of the battery 200 to retain the battery 200 in the charger 400 and to orient the battery 200 with respect to the charger 400. In some embodiments, the receiving slots 418*a*, 418*b* are similar in size, shape, and relative orientation to the receiving slots in the battery chamber 56 of the power tool 10.

In some embodiments, the receiving slots 418*a*, 418*b* can be differently sized so that the battery 200 can only be inserted into the battery chamber 403 in a required orientation (i.e., with the battery terminals 202*a*, 202*b* engaging respective terminals 420*a*, 420*b* of the battery charger 400).

In the illustrated embodiment of FIGS. 11A-20, the receiving slots 418*a*, 418*b* are generally L-shaped. In this manner, after a battery 200 is inserted axially through the opening 404 and into the battery chamber 403, the battery 400 can be pivoted about the battery axis 201 and relative to the casing 402 from an unlocked position, in which the battery 200 is movable axially out of the opening 404, toward a locked position, in which the engagement between the lugs 222*a*, 222*b* and the receiving slots 418*a*, 418*b* prevents the battery 200 from being moved axially out of the battery chamber 403.

As shown in FIGS. 12, 13, and 15A-16, the charger 400 can include an indicator 419 located on an outer surface of the casing 402 and the battery 200 can include a similar indicator 223. In this manner, when the indicator 419 of the charger 400 and the indicator 223 of the battery 200 are misaligned, the operator will be able to confirm that the battery 200 is in the unlocked position. Similarly, when the indicator 419 of the charger 400 and the indicator 223 of the battery 200 are aligned, the operator will be able to confirm that the battery 200 is in the locked position.

In embodiments of the charger 400, such as the illustrated embodiment of FIGS. 11A-20, 20, having L-shaped receiving slots 418*a*, 418*b*, the terminals 420*a*, 420*b* of the battery charger 400 can extend circumferentially around at least a portion of the battery chamber 403 so that the battery terminals 202*a*, 202*b* can be electrically connected to respective terminals 420*a*, 420*b* of the battery charger 400 when the battery 200 is in the locked and unlocked positions.

In some such embodiments, the charger 400 is operable to charge the battery 200 while battery 200 is in either the locked position or the unlocked position. This can be a point of convenience for operators, some of whom may wish to quickly insert the battery 200 for charging without having to pivot the battery 200 toward a locked position. Alternatively, in applications in which the charger 400 is mounted on a wall or another vertical surface (i.e., so that the battery chamber 403 opens in a direction substantially parallel to the ground), operators can insert the battery 200 into the battery chamber 403 and pivot the battery 200 toward the locked position so that the battery 200 can be charged and so that the battery 200 does not fall out of the charger 400 during charging.

Figure 14:
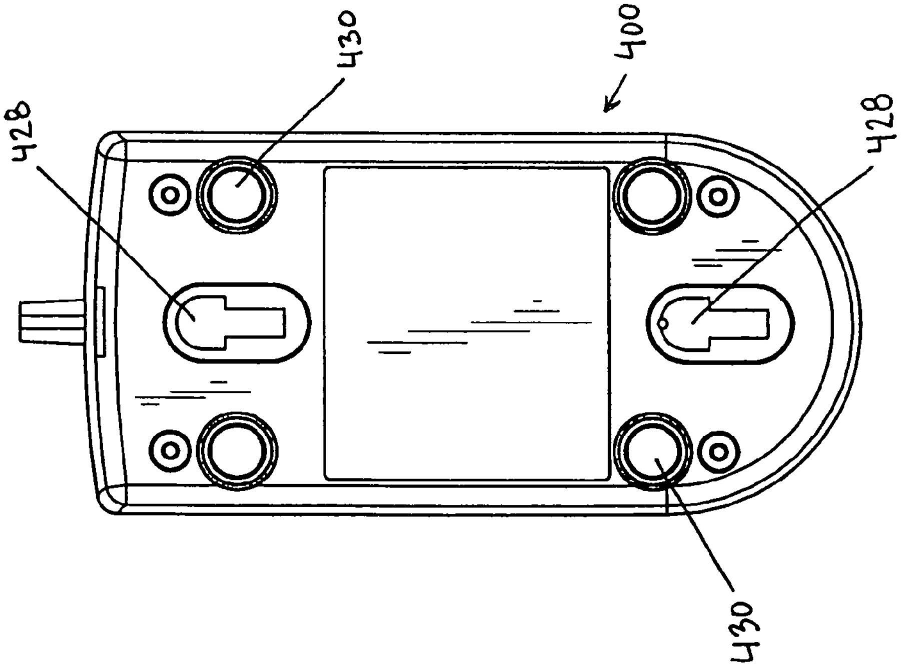
FIG. 14 is a bottom view of the charger shown in FIG. 11A.
Figure 15A:
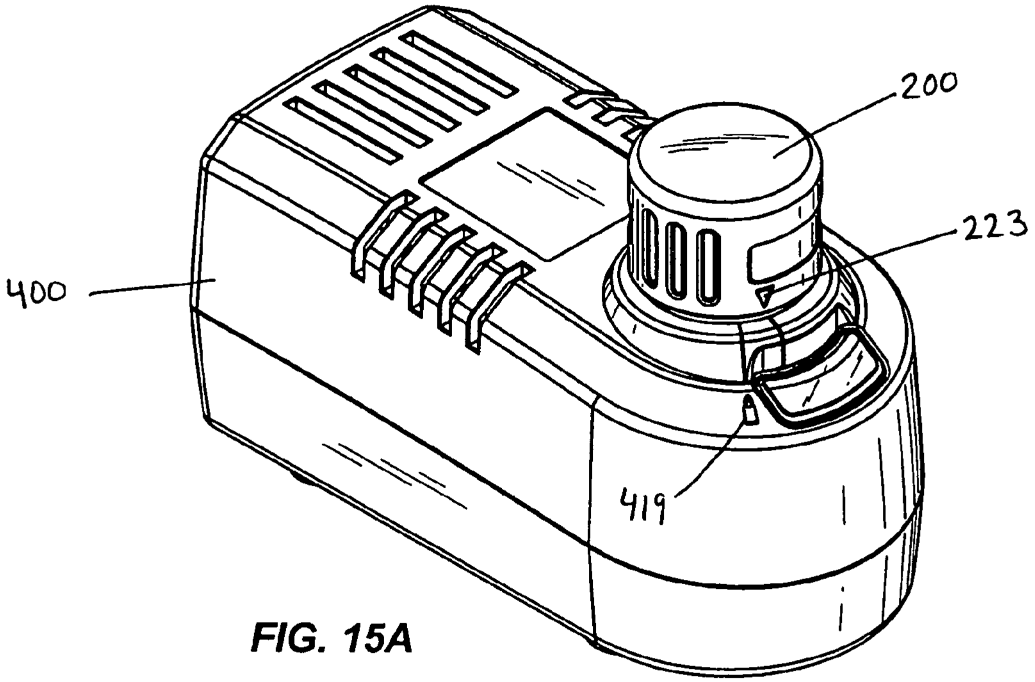
FIG. 15A is a first perspective view of the charger shown in FIG. 11A supporting a battery for charging.
Figure 15B:
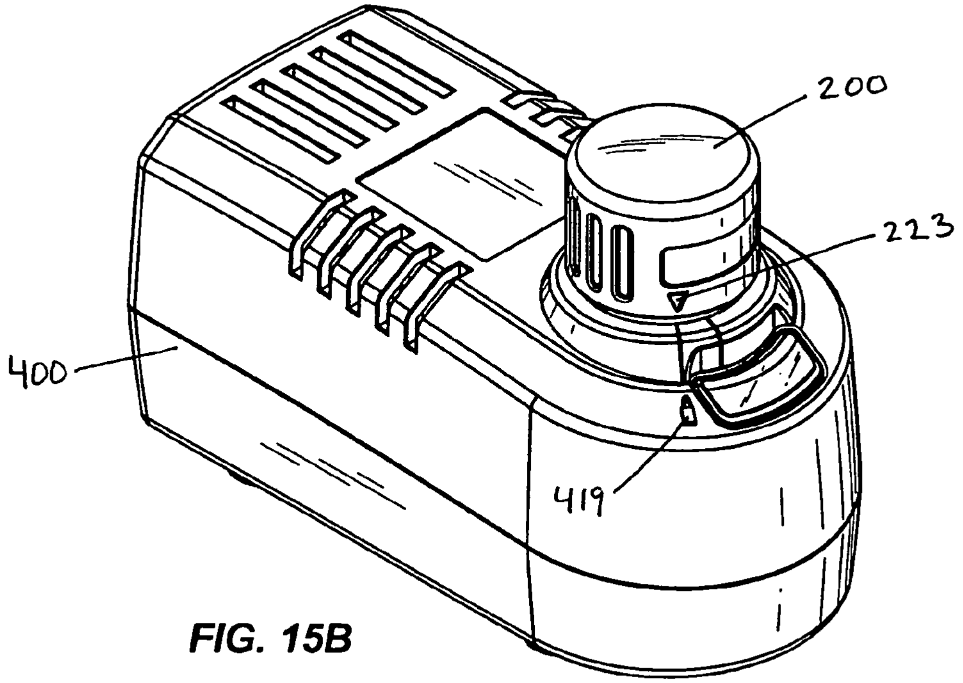
FIG. 15B is a second perspective view of the charger shown in FIG. 11A supporting a battery for charging.
Figure 16:
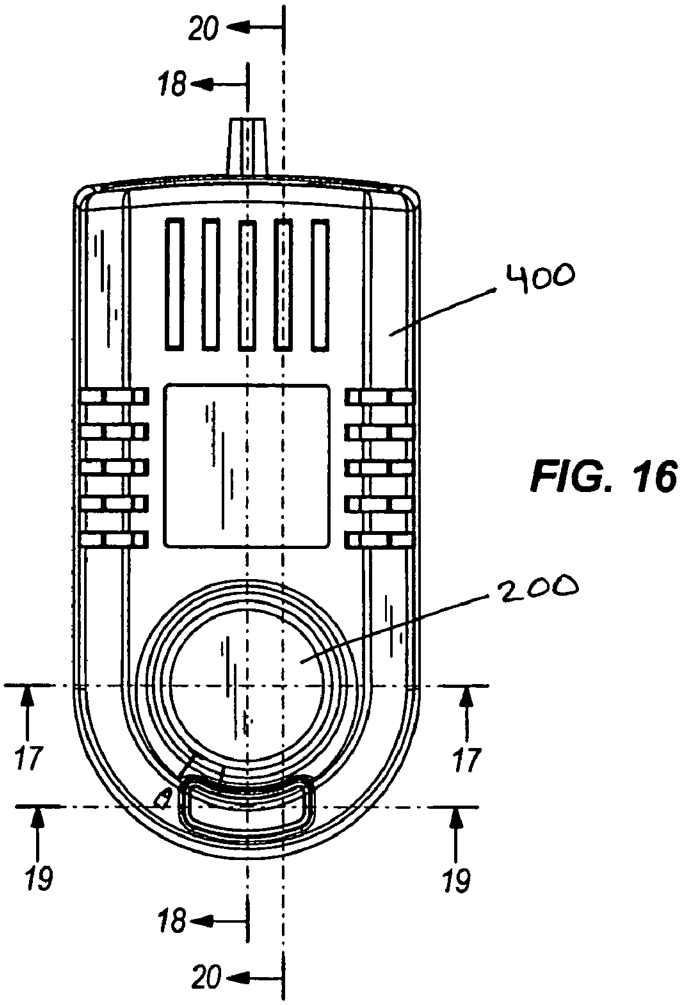
FIG. 16 is a top view of the charger and inserted battery shown in FIG. 15A.
Figure 17:
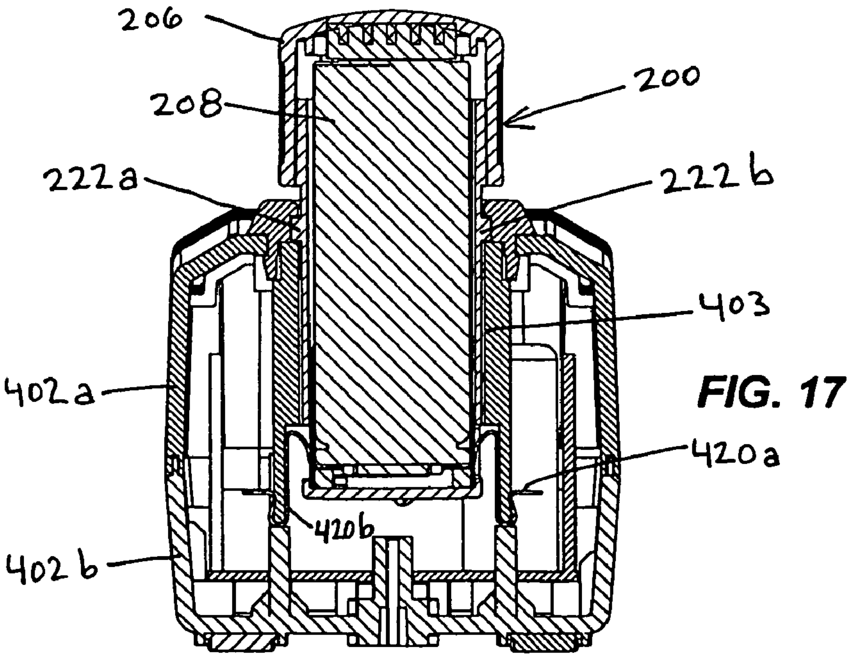
FIG. 17 is a first cross-sectional view of the charger and battery assembly shown in FIGS. 15A-16.
Figure 19:
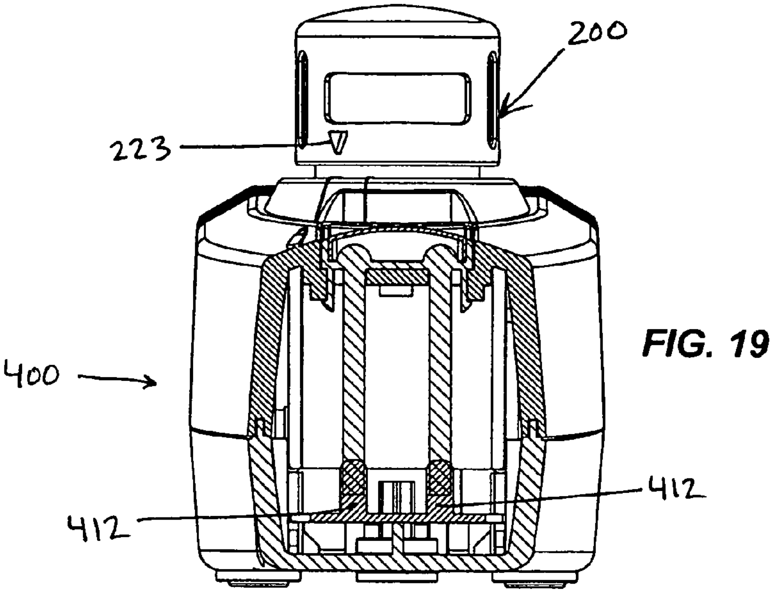
FIG. 19 is a third cross-sectional view of the charger and battery assembly shown in FIGS. 15A-16.
Figure 18:
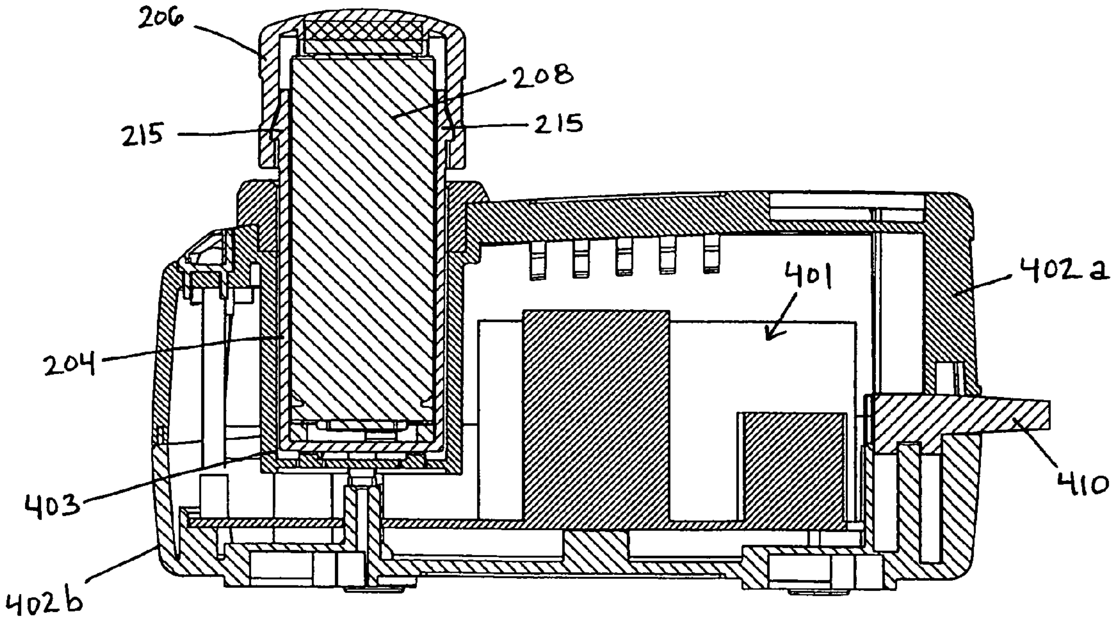
FIG. 18 is a second cross-sectional view of the charger and battery assembly shown in FIGS. 15A-16.
Figure 20:
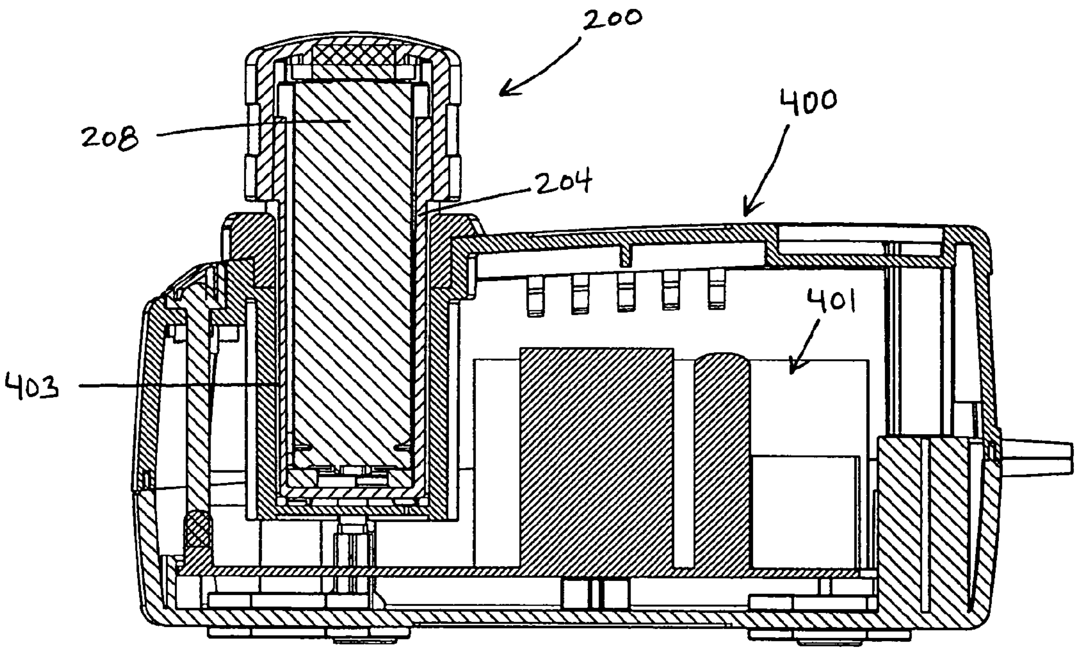
FIG. 20 is a fourth cross-sectional view of the charger and battery assembly shown in FIGS. 15A-16.

As shown in FIG. 14, the charger 400 can include mounting receptacles 428 for mounting the charger 400 on a wall or other inclined surface, or alternatively, for securing the charger 400 to a work cart, a horizontal surface, a work table or bench, and the like. In some embodiments, such as the illustrated embodiment of FIG. 14, the charger 400 can also include feet 430 for supporting the charger 400.

Figure 13:
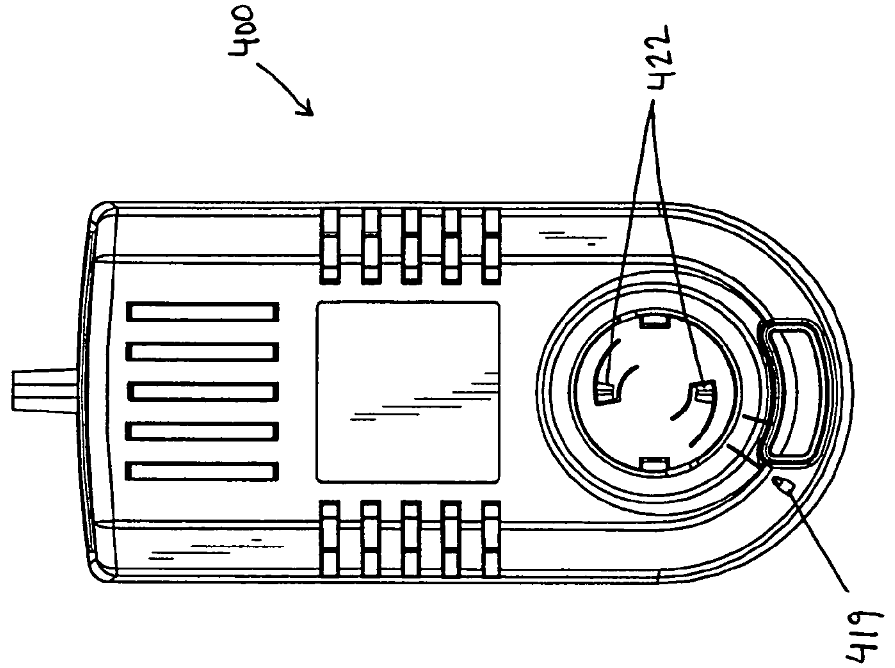
FIG. 13 is a top view of the charger shown in FIG. 11A.

As shown in FIG. 13, the charger 400 can also include detents 422 for engagement with the projections 224 on the battery 200 to provide tactile and/or audible feedback to the operator to indicate to the operator that the operator has moved the battery 200 to the locked position, or alternatively, to the unlocked position. In the illustrated embodiment of FIGS. 11A-20, the detents 422 are elastically deformable and extend horizontally across the lower end of the battery chamber 403. In other embodiments, the detents 422 can have other relative orientations and positions. For example, in some embodiments, the detents 422 can extend circumferentially around the side walls of the battery chamber 403 for engagement with corresponding battery projections 224 located on the sides of the battery 200.

A charge indicator 412 (e.g., a light-emitting diode (LED) or another light) can be supported on the upper charger casing 402*a* for displaying charge data to an operator (e.g., charge time remaining, charging in progress, charging complete, etc.). In other embodiments, the charger 400 can also or alternatively include other indicators or displays.

Operation of the power tool will be discussed with respect to FIGS. 1, 2 and 21.

For operation, an operator grasps the hand grip 16 with a first hand and grasps the body 14 with a second hand and pivots the hand grip 16 about the pivot axis 34 from the first position (shown in FIG. 1) toward the second position (shown in FIG. 2).

If the locking assembly 110 is in the locked position, the operator can move the actuator 114 with respect to the housing 12 to move the locking member 112 from the locked position toward the unlocked position before and/or during pivoting of the body 14 and hand grip 16. When a desired orientation between the body 14 and the hand grip 16 is achieved, the operator can insert a tool into the spindle 30.

The operator can also insert the battery 200 into the battery chamber 56 to provide power to the power tool 10. The operator can then move the trigger 77 toward an operational position, in turn engaging the direction switch 76. When the trigger 77 is activated, power is supplied to the electrical circuit 310 from the battery 200 and the controller 320 wakes from a low power state. The controller 320 in turn takes a state of charge reading from the battery 200, stores the reading in the controller's internal memory (not shown) and activates the fuel gauge 118 to display the current at rest state of charge of the battery 200.

Once the at rest battery state of charge has been measured, the controller 320 switches the normally non-conducting on/off switch 330 into the conducting state such that current is supplied from the battery cell 208 to the motor 28 as determined by the directional switch 76, causing the motor 28 to rotate the spindle 30 and the tool element. The controller 320 continues to display the state of charge reading via the fuel gauge 118 until the predetermined time period expires.

The operator can then move the hand grip 16 from the second position back to the first position, or alternatively, to an intermediate position (not shown) to orient the power tool 10 to operate in a confined workspace and/or to perform a different operation. Alternatively or in addition, an operator may pivot the hand grip 16 about the pivot axis 34 and relative to the body 14 with a flick of the wrist and/or by grasping one of the hand grip 16 and the body 14 with one hand and pressing the other of the hand grip 16 and the body 14 against his body.

In one embodiment, once the trigger 77 is released, the on/off switch 330 is positioned in the non-conducting state and the controller 320 beings to count down the waiting period. In this embodiment, if the user activates the trigger 77 prior to the expiration of the waiting period, the controller 320 approximates the battery's current state of charge based on the previous state of charge reading and the time duration that the motor 28 was running and displays that approximation. In some constructions, if the time duration that the motor 28 was running is longer than a predetermined time period, the controller 320 does not calculate or approximate a current state of charge reading of the battery and does not display any battery state of charge reading on the fuel gauge 118.

If the user activates the trigger subsequent to the expiration of the waiting period, the controller 320 takes another at rest battery state of charge reading prior to activation of the on/off switch 330 and power being supplied to the motor 28, as discussed above.

After operating the power tool 10 and the battery 200, the operator can remove the battery 200 from the power tool 10 and insert the battery 200 into the charger 400 to recharge the battery 200. In some embodiments, the operator can insert the battery 200 axially into the battery chamber 403 of the battery charger 400 to initiate battery charging. Alternatively or in addition, the operator can pivot the battery 200 toward a locked position so that the battery 200 is lockingly secured to the battery charger 400 during charging.

After charging is completed (e.g., after a predetermined charging time or when charging complete data is displayed on the indicator 412 of the charger 400), the operator can remove the battery 200 from the charger 400 and insert the newly charged battery 200 into the battery chamber 56 of the power tool 200. To confirm that the battery 200 is fully charged, the operator can depress the trigger 77, causing the state of charge data to be shown on the display 120.

One or more of the above-identified and other independent features and independent advantages are set forth in the following claims.

What is claimed is:

1. A method of operating a power tool, the power tool including a housing supporting a motor, a switch assembly, and a fuel gauge, the method comprising the acts of:

- activating the switch assembly to electrically connect the motor and a battery;
- measuring a state of charge of the battery;
- displaying the state of charge on the fuel gauge by activating the switch assembly, the state of charge being measured as the switch assembly is activated and before the motor is electrically connected to the battery; and
- stopping the display of the state of charge before deactivating the switch assembly.

2. The method of claim 1, wherein displaying the state of charge includes displaying an at rest state of charge of the battery.

3. The method of claim 1, wherein displaying the state of charge includes displaying the state of charge on the fuel gauge for about 2 seconds after activating the switch assembly.

4. The method of claim 1, further comprising operating the motor, wherein the state of charge of the battery changes during operation of the motor, and wherein, during operation of the motor, the fuel gauge continually displays the state of charge measured before operation of the motor.

5. The method of claim 1, further comprising calculating a second state of charge of the battery, the second state of charge being different than the first state of charge; and displaying the second state of charge before reconnecting the motor and the battery.

6. The method of claim 1, further comprising alerting an operator when the motor is overloaded.

7. The method of claim 6, wherein alerting the operator includes activating the display.

8. The method of claim 6, further comprising stopping the motor when the motor is overloaded.

9. A method of operating a power tool, the power tool including a housing supporting a motor and a fuel gauge, the method comprising the acts of:

connecting a battery to the housing, the battery having an at rest state of charge, the at rest state of charge being a state of charge of the battery before the battery is affected by current draw from the motor;

displaying the at rest state of charge of the battery on the fuel gauge; and activating the motor and continuing to display the at rest state of charge of the battery on the fuel gauge as the battery powers the motor.

10. The method of claim 9, wherein the power tool includes a switch assembly supportable on the housing and operable to electrically connect the motor and the battery, and further comprising moving at least a portion of the switch assembly relative to the housing to measure the at rest state of charge of the battery.

11. The method of claim 10, wherein moving the portion of the switch assembly relative to the housing includes electrically connecting the motor and the battery with the switch assembly, and further comprising removing the at rest state of charge from the fuel gauge before electrically disconnecting the battery and the motor with the switch assembly.

12. The method of claim 9, wherein displaying the at rest state of charge of the battery on the fuel gauge includes displaying the at rest state of charge of the battery before activating the motor.

13. The method of claim 9, wherein the power tool includes a switch assembly supportable on the housing and operable to electrically connect the motor to the battery, and wherein displaying the at rest state of charge of the battery on the fuel gauge includes displaying the at rest state of charge for approximately 2 seconds after moving at least a portion of the switch assembly with respect to the housing.

14. The method of claim 9, further comprising alerting an operator when the motor is overloaded.

15. The method of claim 14, wherein alerting the operator includes displaying an alert on the fuel gauge.

16. The method of claim 14, further comprising deactivating the motor when the motor is overloaded.

17. The method of claim 14, further comprising stopping the display of the at rest state of charge of the battery on the fuel gauge before deactivating the motor.

18. The method of claim 9, further comprising operating the motor and changing a state of charge of the battery, and wherein continuing to display the at rest state of charge of the battery includes displaying the at rest state of charge recorded before operating the motor.

19. A power tool comprising:

a movable spindle for supporting a tool element;

a housing supporting a motor and a drive mechanism driven by the motor, the drive mechanism being operably connected to the spindle for causing movement of the spindle relative to the housing, the housing having a forward end supporting the spindle and a rearward end;

a battery connectable to the rearward end;

a fuel gauge supported on the housing for displaying an at rest state of charge of the battery, the at rest state of charge being a state of charge of the battery before the battery is affected by current draw from the motor; and a switch assembly operable to electrically connect the motor and the battery and activate the fuel gauge to display the at rest state of charge of the battery.

20. The power tool of claim 19, wherein the fuel gauge is operable to display the at rest state of charge during continued operation of the motor.

21. The power tool of claim 19, wherein the fuel gauge is operable to display the at rest charge for approximately 2 seconds after activation of the motor.

* * * * *

UNITED STATES PATENT AND TRADEMARK OFFICE

CERTIFICATE OF CORRECTION

PATENT NO. : 7,649,337 B2
APPLICATION NO. : 11/435596
DATED : January 19, 2010
INVENTOR(S) : Uehlein-Proctor et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 385 days.

Signed and Sealed this

Twenty-third Day of November, 2010

David J. Kappos

*Director of the United States Patent and Trademark Office*

UNITED STATES PATENT AND TRADEMARK OFFICE

CERTIFICATE OF CORRECTION

PATENT NO. : 7,649,337 B2
APPLICATION NO. : 11/435596
DATED : January 19, 2010
INVENTOR(S) : Nancy Uehlein-Proctor, Jeffrey S. Holly and Matthew J. Mergener It is certified that error appears in the above-identified patent and that said Letters Patent is hereby corrected as shown below:

Column 1, Lines 12 and 13, delete “11/435,645” and insert --11/435,640--

Signed and Sealed this
Eighth Day of March, 2011

David J. Kappos
*Director of the United States Patent and Trademark Office*